(12) United States Patent
Croxford

(10) Patent No.: US 11,995,532 B2
(45) Date of Patent: May 28, 2024

(54) SYSTEMS AND DEVICES FOR CONFIGURING NEURAL NETWORK CIRCUITRY

(71) Applicant: Arm Limited, Cambridge (GB)

(72) Inventor: Daren Croxford, Swaffham Prior (GB)

(73) Assignee: Arm Limited, Cambridge (GB)

( * ) Notice: Subject to any disclaimer, the term of this patent is extended or adjusted under 35 U.S.C. 154(b) by 1084 days.

(21) Appl. No.: 16/210,389

(22) Filed: Dec. 5, 2018

(65) Prior Publication Data

US 2020/0184319 A1 Jun. 11, 2020

(51) Int. Cl.
*G06N 3/063* (2023.01)
*G06N 3/08* (2023.01)
*G06N 20/10* (2019.01)

(52) U.S. Cl.
CPC .............. *G06N 3/063* (2013.01); *G06N 3/08* (2013.01); *G06N 20/10* (2019.01)

(58) Field of Classification Search
CPC .......... G06N 3/063; G06N 3/08; G06N 20/10; G06N 3/0454
See application file for complete search history.

(56) References Cited

U.S. PATENT DOCUMENTS

| 10,755,126 | B2 * | 8/2020 | Son | G06N 3/063 |
| 11,182,668 | B2 * | 11/2021 | Martin | G06F 17/15 |
| 2018/0300600 | A1 * | 10/2018 | Ma | G06N 3/04 |
| 2020/0184320 | A1 | 6/2020 | Croxford et al. | |

FOREIGN PATENT DOCUMENTS

WO WO-2018140294 A1 * 8/2018

OTHER PUBLICATIONS

Gysel, P. M. (2016). Ristretto: Hardware-oriented approximation of convolutional neural networks. University of California, Davis. (Year: 2016).*
Li, Y., Zhang, H., & Shen, Q. (2017). Spectral-spatial classification of hyperspectral imagery with 3D convolutional neural network. Remote Sensing, 9(1), 67. (Year: 2017).*
Nakahara, H., & Sasao, T. (2015, September). A deep convolutional neural network based on nested residue number system. In 2015 25th International Conference on Field Programmable Logic and Applications (FPL) (pp. 1-6). IEEE. (Year: 2015).*
Shah, Nimish, Paragkumar Chaudhari, and Kuruvilla Varghese. "Runtime programmable and memory bandwidth optimized FPGA-based coprocessor for deep convolutional neural network." IEEE Transactions on Neural Networks and Learning Systems 29.12 (Apr. 2018): 5922-5934. (Year: 2018).*

* cited by examiner

*Primary Examiner* — Ryan C Vaughn
*Assistant Examiner* — Randall K. Baldwin
(74) *Attorney, Agent, or Firm* — Berkeley Law & Technology Group, LLP

(57) ABSTRACT

Subject matter disclosed herein may relate to storage and/or processing of signals and/or states representative of neural network parameters in a computing device, and may relate more particularly to configuring circuitry in a computing device to process signals and/or states representative of neural network parameters.

49 Claims, 13 Drawing Sheets

SYSTEMS AND DEVICES FOR CONFIGURING NEURAL NETWORK CIRCUITRY

BACKGROUND

Field

Subject matter disclosed herein may relate to storage and/or processing of signals and/or states representative of neural network parameters in a computing device, and may relate more particularly to configuring circuitry in a computing device to process signals and/or states representative of neural network parameters.

Information

Integrated circuit devices, such as processors, for example, may be found in a wide range of electronic device types. For example, one or more processors may be used in mobile devices, such as cellular phones, for example, as well as in computers, digital cameras, tablet devices, personal digital assistants, wearable devices, etc. Mobile devices and/or other computing devices, for example, may include integrated circuit devices, such as processors, to process signals and/or states representative of a diverse of content types for a variety of purposes. With an abundance of diverse content being accessible, signal and/or state processing techniques continue to evolve. At times, however, processing signals and/or states representative of relatively larger amounts of content may prove to be relatively resource-demanding, which may present a number of challenges including, for example, increased processing time, storage demands, complexity, cost, and/or the like.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
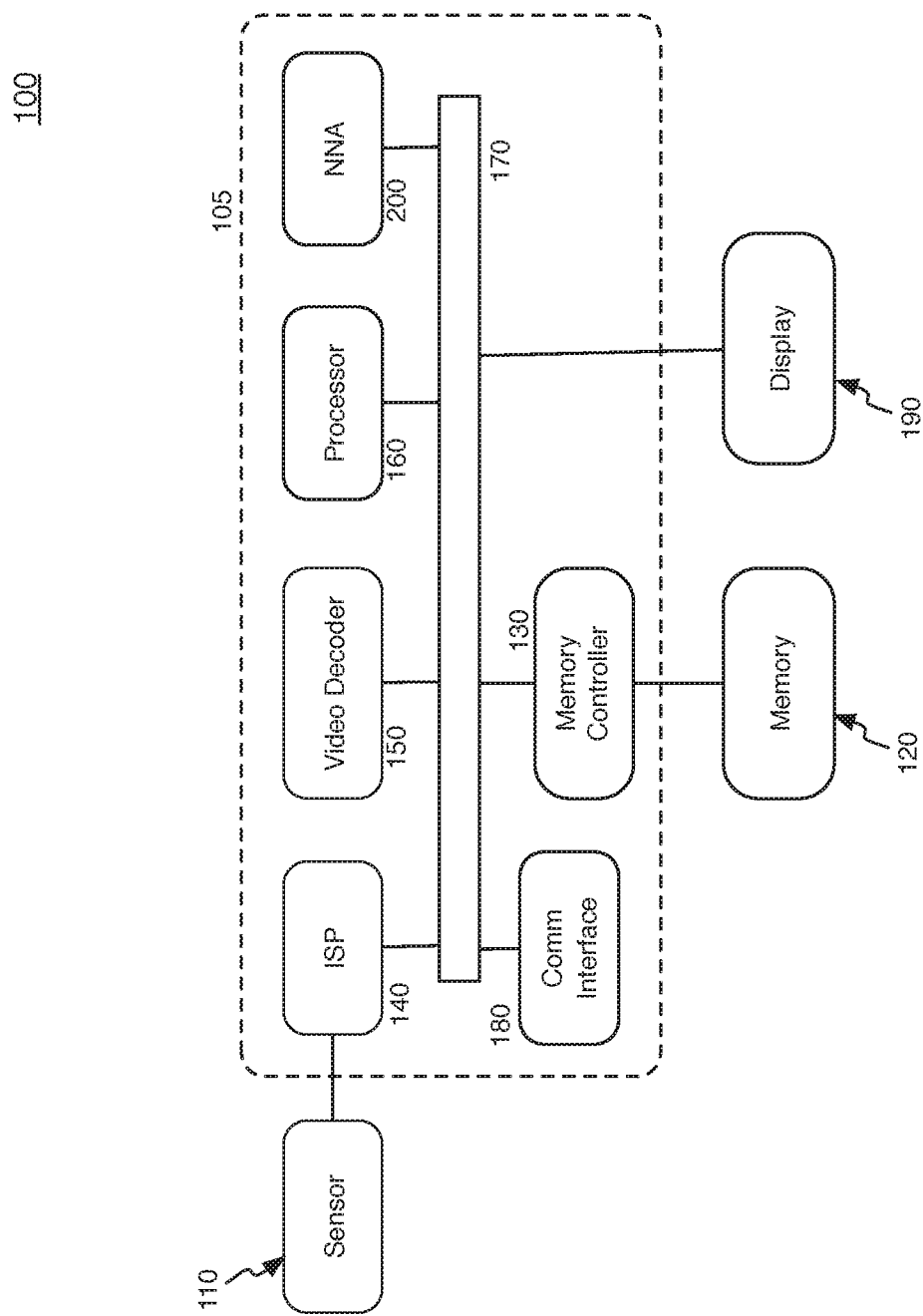
FIG. 1 is an illustration of an example computing device, in accordance with an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter.

References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the patent application, particular context of description and/or usage provides helpful guidance regarding reasonable inferences to be drawn; however, likewise, "in this context" in general without further qualification refers to the context of the present patent application.

As mentioned, integrated circuit devices, such as processors, for example, may be found in a wide range of electronic device types. For example, one or more processors may be used in mobile devices, such as cellular phones, for example, as well as in computers, digital cameras, tablet devices, personal digital assistants, wearable devices, etc. Mobile devices and/or other computing devices, for example, may include integrated circuit devices, such as processors, to process signals and/or states representative of a diverse of content types for a variety of purposes. With an abundance of diverse content being accessible, signal and/or state processing techniques continue to evolve. At times, however, processing signals and/or states representative of relatively larger amounts of content may prove to be relatively resource-demanding, which may present a number of challenges including, for example, increased processing time, increased storage and/or memory demands, increased power consumption and/or heat generation, increased integrated circuit device complexity, increased costs, increased integrated device die area utilization, and/or the like.

In particular implementations, neural network models may find increasing utility in a range of applications including speech recognition, computing device vision applications (e.g., facial recognition, handwriting recognition, etc.), and/or natural language processing, to name but a few examples. Relatively large neural network models, for example, may utilize considerable memory storage space, memory interface bandwidth, and/or processing resources, for example. Such utilization of computing resources may pose challenges for mobile devices, embedded systems, and/or other resource-constrained computing devices, for example.

FIG. 1 is an illustration of an embodiment 100 of an example computing device, in accordance with an embodiment. In an embodiment, computing device 100 may comprise one or more processors, such as processor 160. Also, in an embodiment, computing device 100 may include a memory, such as memory 120. In an embodiment, memory 120 may comprise a non-volatile memory, for example, although claimed subject matter is not limited in scope in this respect. Further, in an embodiment, memory 120 may have stored therein executable instructions, such as for one or more operating systems, device drivers, applications, communications protocols, etc., for example. Memory 120 may also store signals and/or states representative of parameters and/or other types of digital content representative of any of a wide range of possible subject matter. For example memory 120 may store one or more neural network applications and/or parameters representative of the one or more neural networks.

In an embodiment, computing device 100 may execute instructions comprising applications and/or device drivers, for example, directed at computer vision applications. Examples of computer vision applications may include, but are not limited to, image recognition and/or identification (e.g., facial recognition, fingerprint identification, handwritten digit identification, etc.), motion analysis, scene reconstruction, image restoration, etc. Of course, although example embodiments described herein may be applied to example computer vision implementations, claimed subject matter is not limited in scope in this respect. Rather, for example, computing device 100 may be advantageously utilized in any number of settings and/or for any number of purposes.

In an embodiment, a sensor, such as sensor 110, may comprise an image sensor (e.g., camera, fingerprint scanner, document scanner, etc.), although claimed subject matter is not limited in this respect. For example, a computing device, such as computing device 100, may include any of a range of sensor types, such as, for example, one or more cameras, microphones, biological sensors, accelerometers, gyroscopes, thermometers, magnetometers, barometers, proximity sensors, etc., to name but a few non-limiting examples. In an embodiment, an image sensor, such as image sensor 110, may provide image content to an image signal processor (ISP), such as ISP 140. For example, image sensor 110 may generate signals and/or signal packets that may be communicated (e.g., electrically conducted) between image sensor 110 and ISP 140. In another embodiment, a video decoder, such as video decoder 150, may decode image content (e.g., video content) obtained from other video sources, such from a communications interface, such as communications interface 180 (e.g., streamed video connection) and/or from a memory, such as memory 120, for example.

In an embodiment, image content generated and/or obtained by ISP 140 and/or decoder 150, for example, may be stored in a memory, such as memory 120. A shared bus structure, such as interconnect 170, may provide for communication of signals and/or signal packets between various components of computing device 100. For example, signal packets comprising image content may be communicated between ISP 140 and memory 120 and/or between decoder 150 and memory 120, in an embodiment. Similarly, a processor, such as processor 160, may obtain signal packets comprising executable instructions from memory 120 via interconnect 170, for example. A memory controller, such as memory controller 130, may control access to memory 130, in an embodiment. For example, image content decoded at video decoder 150 may be transmitted as one or more signals to memory controller 130, and memory controller 130 may cause the signals to be stored in memory 120.

In an embodiment, computing device 100 may further comprise a neural network accelerator (NNA), such as NNA 200. In an embodiment, NNA 200 may include a number of multiplication circuits and/or a number of add circuits that may be utilized to process neural network parameters. In an embodiment, a processor, such as processor 160, may execute a software application that may implement one or more neural networks, for example, and/or may execute a device driver pertaining to NNA 200, for example. "Device driver" refers to a set of executable instructions that, if executed by a processor, may allow a software application and/or operating system to communicate and/or interact with a hardware component and/or device. A device driver may provide a link between a hardware component, such as NNA 200, and/or software elements (e.g., operating system, software applications, etc.) of a computing system, in an embodiment. For example, by way of a "call" to an appropriate device driver, a neural network application and/or operating system may request that particular content, such as particular neural network parameters, for example, be transmitted to and/or processed by NNA 200. In an embodiment, a device driver may configure, arrange, and/or re-arrange content, such as neural network parameters, for example, in a manner that may make more efficient use of a hardware component, such as NNA 200, as discussed more fully below.

In an embodiment, a computing device, such as computing device 100, may include a neural network accelerator, such as NNA 200, that may be separate from a general purpose processor, such as processor 160. However, claimed subject matter is not limited in scope in these respects. For example, in some embodiments, neural network operations, such as multiply-accumulate (MAC) operations, may be performed by a general purpose processor, such as processor 160. In an embodiment, for example, a processor, such as processor 160, may include circuitry directed to neural network acceleration operations. For example, a processor, such as processor 160, may include one or more multiplication units available to operate on neural network parameters. In still other embodiments, neural network acceleration operations may be shared between a general purpose processor, such as processor 160, and a dedicated neural network accelerator hardware component, such as NNA 200. In an embodiment, a processor, such as processor 160, and/or a neural network accelerator hardware component, such as NNA 200, may communicate and/or otherwise interact by way of an interconnect, such as interconnect 170. As mentioned, processor 160 may communicate with and/or interact with NNA 200, for example, over interconnect 170 responsive to execution of a device driver pertaining to NNA 200. In an embodiment, a device driver, such as a device driver pertaining to NNA 200, may be stored in a memory, such as memory 120.

In an embodiment, a processor, such as processor 160, and/or a neural network accelerator component, such as NNA 200, may share an integrated circuit die and/or may share an integrated circuit package. In other embodiments, processor 160 and/or NNA 200 may comprise separate integrated circuit devices. In an embodiment, ISP 140, decoder 150, processor 160, NNA 200, communication interface 180, and/or memory controller 130 may share an integrated circuit die and/or package 105.

In an embodiment, computing device 100 may also include one or more communications interfaces, such as communications interface 180. In an embodiment, communications interface 180 may enable wired and/or wireless communications between computing device 100 and one or more other computing devices. In an embodiment, wired and/or wireless communications may occur substantially in accordance any of a wide range of communication protocols, such as those mentioned herein, for example. Further, in an embodiment, computing device 200 may include a display, such as display 190. In an embodiment, display 190 may comprise a touch-screen display, although claimed subject matter is not limited in scope in these respects. In an embodiment, computing device may comprise a mobile computing device (e.g., cellular telephone, tablet device, watch, etc.), although claimed subject matter is not limited in scope in this respect.

As mentioned, neural networks, including relatively large neural network models, for example, may utilize considerable memory storage space, memory interface bandwidth, and/or processing resources, for example. Such utilization of computing resources may pose challenges for computing devices, such as mobile and/or wearable computing devices and/or other resource constrained computing devices, for example. In some circumstances, neural network models may include multiple layers, including, for example, one or more convolution layers, wherein individual layers may receive input parameters (e.g., input feature maps) and/or may generate output parameters (e.g., output feature maps) based, at least in part, on particular weight values that may make up a "filter" and/or "kernel." As utilized herein, "filter" and/or "kernel" as the terms are applied to neural networks may be used interchangeably. In an embodiment, a kernel comprises a plurality of weight parameters (e.g., expressed as physical signals and/or states) that may be applied to a plurality of input parameters within an individual layer of a neural network. Because neural networks may employ any number of kernels across any number of layers, it may be advantageous to develop techniques to reduce the amount of weight parameters within at least some kernels and/or to reduce sizes of at least some kernels that are to be applied to input parameters within one or more layers of a neural network.

For example, in some circumstances, at least some weight parameters may have values that may change as calculations (e.g., activation functions) are made within various layers of a neural network. In other circumstances, some kernels may comprise weight parameters that may have static values. For example, once a neural network has been trained, a number of kernels intended to be applied to at least some input parameters (e.g., input feature map) within a particular layer of a neural network may include weight parameters having values that are not intended to change (referred to herein at times as "static" weight parameters), those values having been determined via a training process, for example. In some implementations, a neural network may be retrained occasionally and/or periodically, for example. At least in part in response to a retraining, for example, at least some weight parameters, including static weight parameters, for example, may be altered from previous values. In some circumstances, a number of static weight parameters may have a value of "0" as a result of a training operation, for example. Because multiplication operations involving a value "0" result in a result of "0," it may be advantageous to avoid performing those operations in some situations.

In some circumstances, circuitry may be designed and/or implemented to avoid performing at least some multiplication operations when a value of "0" is involved. Such implementations, in some circumstances, may employ relatively complex control logic and/or relatively large amounts of additional circuitry to analyze weight values (e.g., non-static weight values) "on-the-fly" (e.g., during execution of a neural network) within various layers of a neural network. Such added complexity, for example, may result in an increase in integrated die size, an increase in power consumption, an increase in heat generation, an increase in costs, etc. Also, in some circumstances, accesses to memory may become non-aligned, potentially resulting in a reduction in efficiency with respect to computing resource utilization. Further, in some circumstances, some weight parameters having a value of "0" may not be eliminated utilizing these techniques, and in those circumstances an entire kernel may need to be computed across input parameters (e.g., input feature map) before processing can begin for a subsequent kernel. Because of the various potential issues that may be involved in implementing an "on-the-fly" system to address "0" value weight parameters, it may be advantageous to develop techniques to address at least some "0" value weight parameters ahead of time.

In an embodiment, a device driver, such as may be executed by a processor, such as processor 160, for example, may analyze a trained neural network to determine which kernels comprise static weight parameters. A device driver, executed by processor 160, for example, may also analyze the trained neural network to determine which of the static weight parameters have a value of "0" and/or to determine which of the static weight parameters have non-zero values. A device driver, executed by processor 160, for example, may further analyze neural network acceleration circuitry, such as NNA 200, for example, to determine available computing resources, for example. A device driver, executed by processor 160, for example, may also configure hardware, such as NNA 200, for example, based at least in part on an analysis of neural network parameters (e.g., weight parameters) and/or on an analysis of the hardware, in an embodiment. A device driver, executed by processor 160, for example, may also analyze computing resources available at processor 160 and/or at other computing device components, for example. In an embodiment, a device driver, executed by a processor, such as processor 160, may configure at least some weight values of at least some kernels representative of a neural network and/or may configure one or more aspects of computing device hardware, for example, to more efficiently utilize available computing resources.

In an embodiment, a neural network may comprise content (e.g., stored as signals and/or states in a memory, such as memory 120) indicating a particular number of layers for the neural network. Neural network content may further indicate, for individual layers, a size of a layer and/or a kernel size. For example, a kernel size may be indicated by specifying a height and/or width (e.g., 3×3, 4×4, etc.). In an embodiment, a kernel may be specified as an array (e.g., one or more dimensions) of weight parameters. In an embodiment, neural network content may also indicate, for individual layers, an activation function and/or a number of input feature maps. In an embodiment, a number of input feature maps may determine, at least in part, a depth "N" of a kernel (e.g., 3×3×N). Also, in an embodiment, neural network content may indicate a number of output feature maps. In an embodiment, a number of output feature maps may determine, at least in part, a number "M" of kernels in a particular layer. Further, in an embodiment, for individual kernels, values for weight parameters may be specified. In an embodiment, neural network content may specify, in the case of a 3×3 kernel specification, 3×3×N×M weight parameter values for individual layers in a particular neural network. Neural network content may also specify a kernel bias, for example. In an embodiment, kernel bias refers to a scalar value that may be applied to individual weight parameters of a kernel.

As utilized herein, "0" and/or "non-zero" values may refer to integers, Boolean values, and/or floating point numbers and/or the like that may be stored, for example, as signals and/or states in a buffer or other memory device, in an embodiment. In particular implementations, "0" may comprise a binary value. Also, although a value of "0" may be discussed herein in connection with various embodiments, such as in connection with particular weight parameters, other embodiments may treat values approaching zero as "0." That is, in particular implementations, a value "0" may refer to "0" and/or may refer to values approximating zero. Also, in an embodiment, values determined to fall below a particular threshold value may be referred to as "0."

In an embodiment, a device driver may be executed by a processor, such as processor 160, may analyze a neural network, such as neural network content stored in memory 120, for example, to determine which weight parameters among individual layers of a neural network have values of "0." A device driver, executed by processor 160, for example, may identify a reduced set of parameters. In an embodiment, a reduced set of parameters may include one or more parameters determined to have non-zero values. For example, a device driver may analyze one or more kernels having static weight parameters to determine which weight parameters have a value of "0" and/or to determine which weight parameters have non-zero values. One or more reduced kernels may be identified, wherein the reduced kernels may include weight parameters having non-zero values and may exclude weight parameters having "0" values.

For example, a 3×3 kernel (e.g., nine static weight parameters in a 3×3 array) may be reduced to a 2×2 kernel (e.g., four static weight parameters in a 2×2 array having non-zero values) in response to an analysis identifying five weight parameters having "0" values. For another example, a 4×4 kernel (e.g., sixteen static weight parameters in a 4×4 array) may be reduced to a set of ten weight parameters having non-zero values in response to an identification of six weight parameters having "0" values. In an embodiment, hardware, such as processor 160 and/or NNA 200, for example, may be implemented to support a number of kernel sizes, such as, for example, 2×2, 3×3, 4×4, 5×5, 7×7, etc., and/or may further be implemented to support any number of additional sizes. For example, hardware, such as processor 160 and/or NNA 200, for example, may be implemented to support one or more kernels having relatively more typical sizes of 2×2, 3×3, 4×4, 5×5, 7×7, for example, and/or may further support one or more kernels having relatively less typical sizes (e.g., any of a range between two to forty-two weight parameters). Of course, claimed subject matter is not limited in scope to any particular kernel sizes and/or reduced kernel sizes.

Additionally, in an embodiment, a device driver, executed by a processor, such as processor 160, may map a reduced set of neural network parameters to a plurality of multiplication circuits. Further, a processor, such as processor 160, may initiate processing via the plurality of multiplication circuits of a reduced set of parameters and a set of input parameters in accordance with a mapping to generate a set of output parameters (e.g., output feature map), in an embodiment. For example, due at least in part to a device driver's analysis of available hardware circuitry (e.g., MAC units) and/or due at least in part to generation of a reduced set of weight parameters (e.g., one or more reduced kernels), a device driver, executed by processor 160, for example, may map a reduced set of parameters to available hardware in a more efficient manner.

As utilized herein, "map," "mapping," and/or the like refer to assigning particular content (e.g., signals and/or states) to particular circuitry (e.g., storage buffers, MAC units, etc.). For example, and as discussed more fully below, a neural network accelerator, such as NNA 200, may include a number of MAC units available to perform multiply-and-accumulate operations, for example. In an embodiment, individual MAC units may multiply one or more values, such as weight parameters, with one or more input parameters (e.g., input feature map). A device driver, for example, may determine that a particular kernel be delivered to one or more particular MAC units and/or may also determine that particular input parameters be delivered to the one or more particular MAC units. A kernel, for example, may be mapped a number of times concurrently across an array of MAC units, for example. Example mappings are described below, although claimed subject matter is not limited in scope to the particular examples provided.

In an embodiment, due at least in part to generation and/or utilization of reduced kernels, a particular reduced kernel may be mapped a greater number of times concurrently across a given array of MAC units, for example, than would otherwise be possible using non-reduced kernels. Such an increase in a number of concurrent mappings may result in increased efficiency with respect to computing resource utilization and/or may result in decreased processing time, decreased power consumption, reduced costs, etc. Further, because a device driver may, through interaction with and/or configuration of hardware circuitry, perform such efficiency-improving operations via execution by a general-purpose processor, such as processor 160, for example, there may be little or no additional complexity introduced in the hardware circuitry. Rather, in some embodiments, neural network acceleration circuitry may be simplified to at least an extent.

Additionally, because a device driver, executed by processor 160, for example, may perform an analysis of neural network parameters and/or available hardware prior to execution of a neural network, an analysis may have relatively little negative impact on overall system performance. Further, results of an analysis may be reused any number of times. Therefore, any overhead incurred in performing an analysis and/or in generating reduced kernels, for example, may be spread over the course of many repeated executions of a neural network, in an embodiment. Further, improvements in efficient utilization of computing resources for neural networks and/or reductions in amounts of computing resources to be allocated for neural network operations may lead to increased utility of neural networks in mobile devices and/or in other resource-constrained computing devices.

In an embodiment, a device driver, such as may be executed by processor 160, for example, may store results of an analysis of a particular neural network at least in part by storing kernels (e.g., reduced kernels) to implement a neural network and/or by storing content indicative weight parameters having a value of "0," for example. A device driver may further store parameters indicative of other efficiency improvements such as, for example, particular hardware configurations, mappings, etc., that may be utilized upon a subsequent execution of a particular neural network. In this manner, analysis of a neural network directed at improving efficiency of operation may be performed ahead-of-time and need not be performed at time of execution. Further, in an embodiment, neural network analysis such as described herein, for example, may be performed on a separate computing device. Content representative of such an analysis may be provided by a separate computing device to computing device 100, for example, for utilization upon execution of a neural network, in an embodiment.

Figure 2:
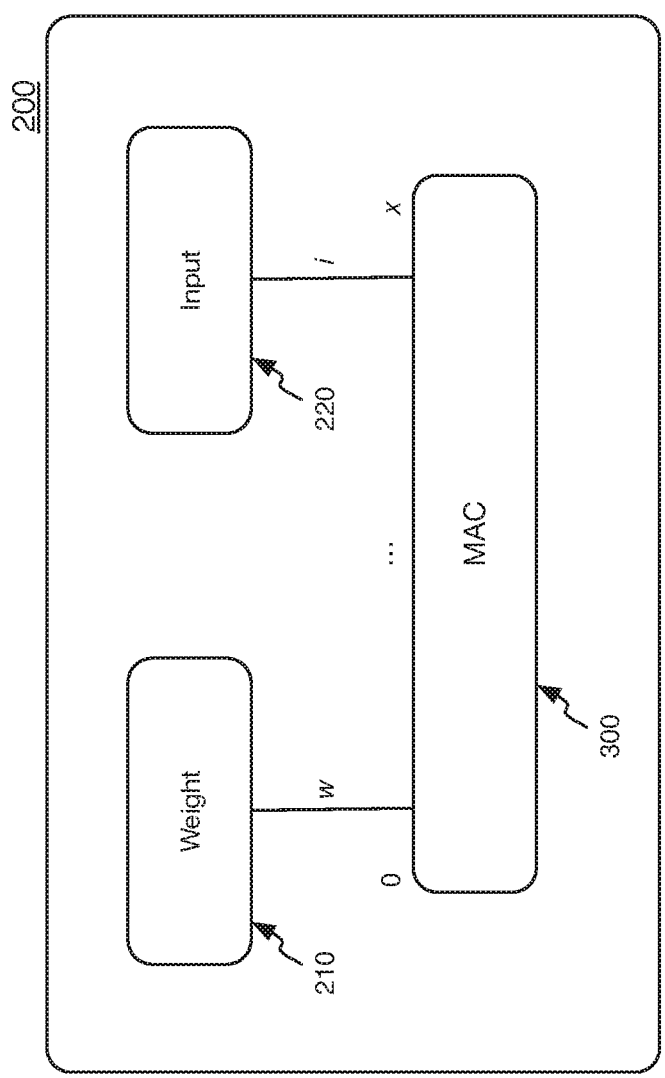
FIG. 2 is an illustration depicting example circuitry for operating on neural network parameters, in accordance with an embodiment.
Figure 3:
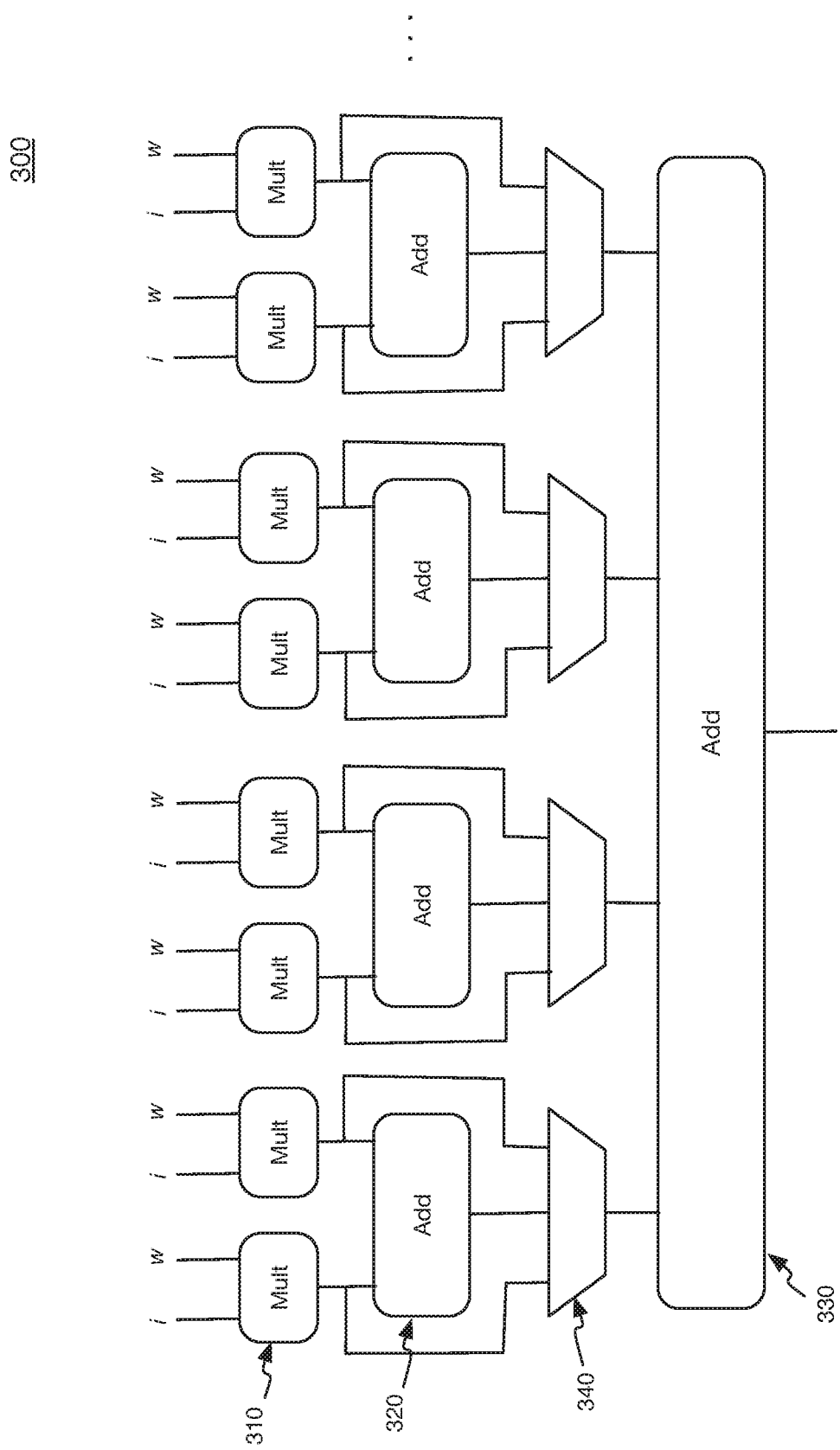
FIG. 3 is a schematic diagram illustrating example multiply-and-accumulate (MAC) circuitry, in accordance with an embodiment.

FIG. 2 is an illustration depicting an example embodiment 200 of circuitry for operating on neural network parameters. In an embodiment, NNA 200 may comprise a one-dimensional (1 D) MAC array, such as MAC array 300. Although NNA is depicted in FIG. 2 as including a 1D MAC array, claimed subject matter is not limited in scope in this respect. For example, other embodiments, such as those described below, may implement 2D MAC arrays. In an embodiment, NNA 200, for example, may also include storage buffers 210 to store kernels and/or storage buffers 220 to store input parameters. In an embodiment, a device driver pertaining to NNA 200 may determine which kernels are stored in particular buffers of storage 210 and/or may determine which input parameters to store in particular buffers of storage 220. Such determination may be made as part of an analysis process performed by the device driver, executed by processor 160, for example, to determine advantageous mappings of kernels to available MAC circuitry. In an embodiment, a 1D MAC array, such as MAC array 300, may include five-hundred twelve multipliers and/or may include six rows of adder circuits, for example. However, claimed subject matter is not limited in scope in these respects. In an embodiment, individual rows of adder circuits may be bypassed, as depicted in FIG. 3, discussed below. As depicted in FIG. 2, weight parameters may be designated herein by a symbol "w" and input parameters may be designated herein at times by a symbol "i." As further depicted in FIG. 2, storage buffers 210 may provide signals and/or states representative of weight values to MAC array 300. Also, storage buffers 220 may provide signals and/or states representative of input parameters to MAC array 300.

FIG. 3 is a schematic diagram illustrating an embodiment 300 of example MAC circuitry, including a 1D MAC array.

As mentioned, a 1D MAC array may include a plurality of multiplication circuits, such as multiplication circuits 310, and/or may include one or more rows of adder circuits, such as adder circuits 320 and/or adder circuits 340. As previously indicated, one or more rows of adder circuits may be bypassed. In an embodiment, a device driver, such as a device driver pertaining to NNA 200, for example, may configure the one or more rows of adder circuits, including configuring circuitry to bypass one or more rows of adder circuits. MAC array 300 may also include an additional adder circuit, such as circuit 330, to sum contributions from adder circuits 320 and/or 340, for example.

As depicted in FIG. 3, individual multiplication circuits 310 may receive as inputs one or more input parameters i and/or one or more weight parameters w. In an embodiment, input parameters (e.g., input feature map) may be provided to multiplication circuits 310 from storage 210 under control, for example, of a device driver executed by a processor, such as processor 160. Similarly, weight parameters may be provided to multiplication circuits 310 from storage 220 under control of the device driver executed by processor 160. Further, as discussed more fully below, weight parameters and/or input parameters may be mapped to particular MAC units and/or to particular multiplication circuits within a MAC unit. For example, as mentioned, a device driver may map particular weight parameters and/or input parameters to particular multiplication circuits based on an analysis performed prior to execution of a neural network application, in an embodiment.

Although example 1D MAC array 300 is depicted as including eight multiplication circuits, three rows of adder circuits, etc., claimed subject matter is not limited in scope in these respects. As mentioned, in an embodiment, a 1D MAC array may comprise five-hundred twelve multiplication circuits and/or six rows of adder circuits, although claimed subject matter is not limited in scope in these respects. In an embodiment, with six rows of adder circuits, for example, kernels of up to sixty-four weight parameters in size (e.g., 2D 8×8 kernel) may be accommodated, although, again, claimed subject matter is not limited in scope in these respects.

In an embodiment, mapping kernels onto a MAC array may be performed using a variety of techniques. For example, to reduce memory access operations, it may be advantageous to utilize either an "input stationary" approach or a "weight stationary" approach. For example, particular circuitry, such as NNA 200 depicted in FIG. 2, may include a set of registers, such as input parameter storage buffers 220 depicted in FIG. 2, to store a state characterized by a set of input parameters (e.g., input feature map) and/or may include a set of registers, such as weight parameter storage buffers 210 depicted in FIG. 2, to store a state characterized by a set of weight parameters (e.g., one or more kernels). In an embodiment, an operation, such as a multiplication operation, may include an operand "A" and an operand "B." For example, a multiplication circuit, such as MAC unit 300, may obtain operand A from input parameter storage buffers 220 and may obtain operand B from weight parameter storage buffers 210. For an input stationary approach, operand A (e.g., input parameters) may be held static for sequential multiplication operations while operand B (e.g., weight parameters) may vary. That is, for sequential multiplication operations, MAC 300 may obtain different sets of weight parameters from storage buffers 210 while maintaining a particular set of input parameters. In this manner, for example, a series of different sets of weight parameters (e.g., kernels) may be applied to a particular set of input parameters (e.g., input feature map) in a sequential manner until all of the kernels for a particular layer of a neural network have been applied to the particular set of input parameters.

In contrast, for a weight stationary approach, operand B (e.g., weight parameters) may be held static for sequential multiplication operations while operand A (e.g., input parameters) may vary. That is, for sequential multiplication operations, MAC 300 may obtain different sets of input parameters from storage buffers 220 while maintaining a particular set of weight parameters. In this manner, for example, a series of different sets of input parameters (e.g., portions of an input feature map) may be applied to a particular set of weight parameters (e.g., one or more kernels) in a sequential manner until the particular weight parameters have been applied to all of the input parameters for a particular layer of a neural network.

In an embodiment, a mixture of weight stationary and/or input stationary approaches may be implemented. For example, weight stationary processing may be performed on particular regions of input parameters (e.g., 6×6 region of a larger input feature map) in succession. For example, once weight stationary processing is completed for a particular region of input parameters, processing may proceed to a subsequent region of input parameters. However, claimed subject matter is not limited in scope in these respects. Additionally, in an embodiment, multiple processing engines (e.g., multiple MAC circuits, processors, etc.) may operate on different kernels concurrently, for example.

In an embodiment, one or more particular kernels may be scanned (e.g., via MAC operations) across an input feature map to generate an output feature map, for example. In an embodiment, once a particular kernel has been applied to all of an input feature map, subsequent kernels may be successively scanned across the input feature map until a complete output feature map is generated for the particular layer of the particular neural network. In an embodiment, an output feature map of a particular layer may be utilized as an input feature map of a subsequent layer of the neural network.

Figure 4:
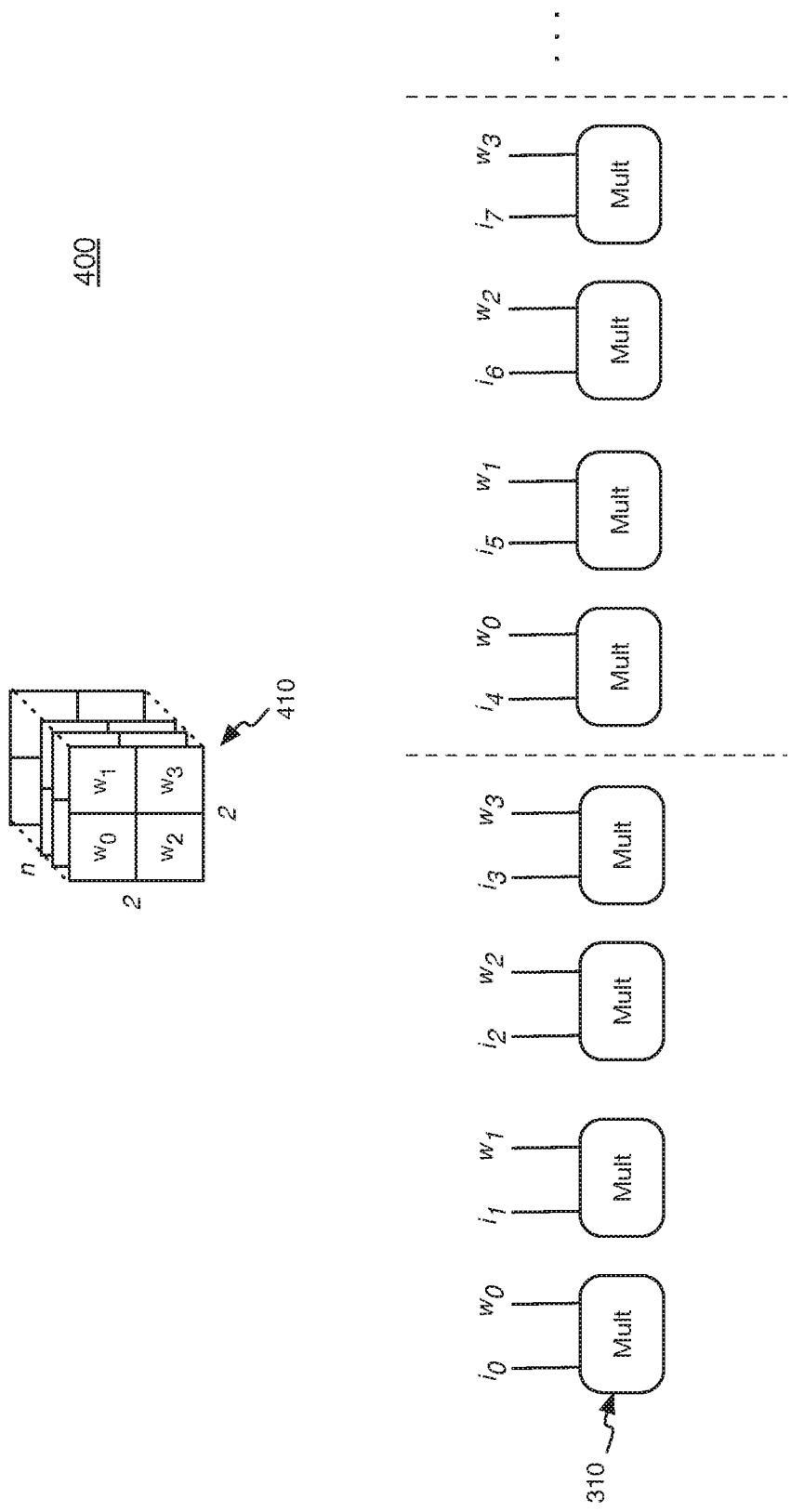
FIG. 4 is an illustration depicting an example kernel slice mapped onto example multiplication circuits, in accordance with an embodiment.

FIG. 4 is an illustration depicting an embodiment 400 of an example mapping of a kernel onto an example array of multiplication circuits, such as multiplication circuits 310. FIG. 4 depicts a three-dimensional (3D) kernel and a 2D slice 410 of the larger 3D kernel. As utilized herein, a kernel "slice" refers to an individual 2D layer of a 3D kernel along a particular dimension. At times, "kernel slice" and "kernel" may be used interchangeably. For example, a kernel slice may be thought of as a portion of a larger kernel, and/or may also be thought of as a 2D kernel. Further, although embodiments herein may describe a kernel and/or kernel slice as a 2D and/or 3D structure, claimed subject matter is not limited in scope in this respect. For example, for particular implementations, a kernel may comprise a one-dimensional array of parameters.

In FIG. 4, an example weight stationary approach is depicted. As illustrated in FIG. 4, kernel slice 410 includes weight parameters $w_0$, $w_1$, $w_2$, and $w_3$, for example. A set of input parameters (e.g., input feature map) may include input parameters $i_0$, $i_1$, . . . , $i_y$. In an embodiment, for circumstances in which weight parameters $w_0$, $w_1$, $w_2$, and $w_3$ respectively include non-zero values, and/or for circumstances wherein no determination is made as to whether weight parameters $w_0$, $w_1$, $w_2$, and $w_3$ include "0" values, all of weight values $w_0$, $w_1$, $w_2$, and $w_3$ of kernel slice 410 may be mapped across multiplication circuits 310 as indicated, wherein the mapping results in a repeating pattern including all four weight parameters $w_0$, $w_1$, $w_2$, and $w_3$. Input parameters $i_0$, $i_y$ may also be mapped across multiplication circuits 310, as also depicted in FIG. 4. For example, weight parameters $w_0$, $w_1$, $w_2$, and $w_3$ may be applied to a subset of input parameters including $i_0$, $i_1$, $i_2$, and $i_3$, and/or may also be applied to a subset of input parameters including $i_4$, $i_5$, $i_6$, and $i_7$, and/or to a subset of input parameters including $i_8$, $i_9$, $i_{10}$, and $i_{11}$, and so forth. In embodiments with an array of five-hundred twelve multiplication circuits, for example, kernel slice 410 may be mapped across multiplication circuits 310 one hundred twenty-eight times, for example. That is, kernel slice 410, having four weight parameters, may be applied to one-hundred twenty-eight subsets of input parameters concurrently, in an embodiment. Multiple cycles of one-hundred twenty-eight multiplication operations, for example, may be utilized to process all parameters of an input feature map, in some circumstances.

Figure 5:
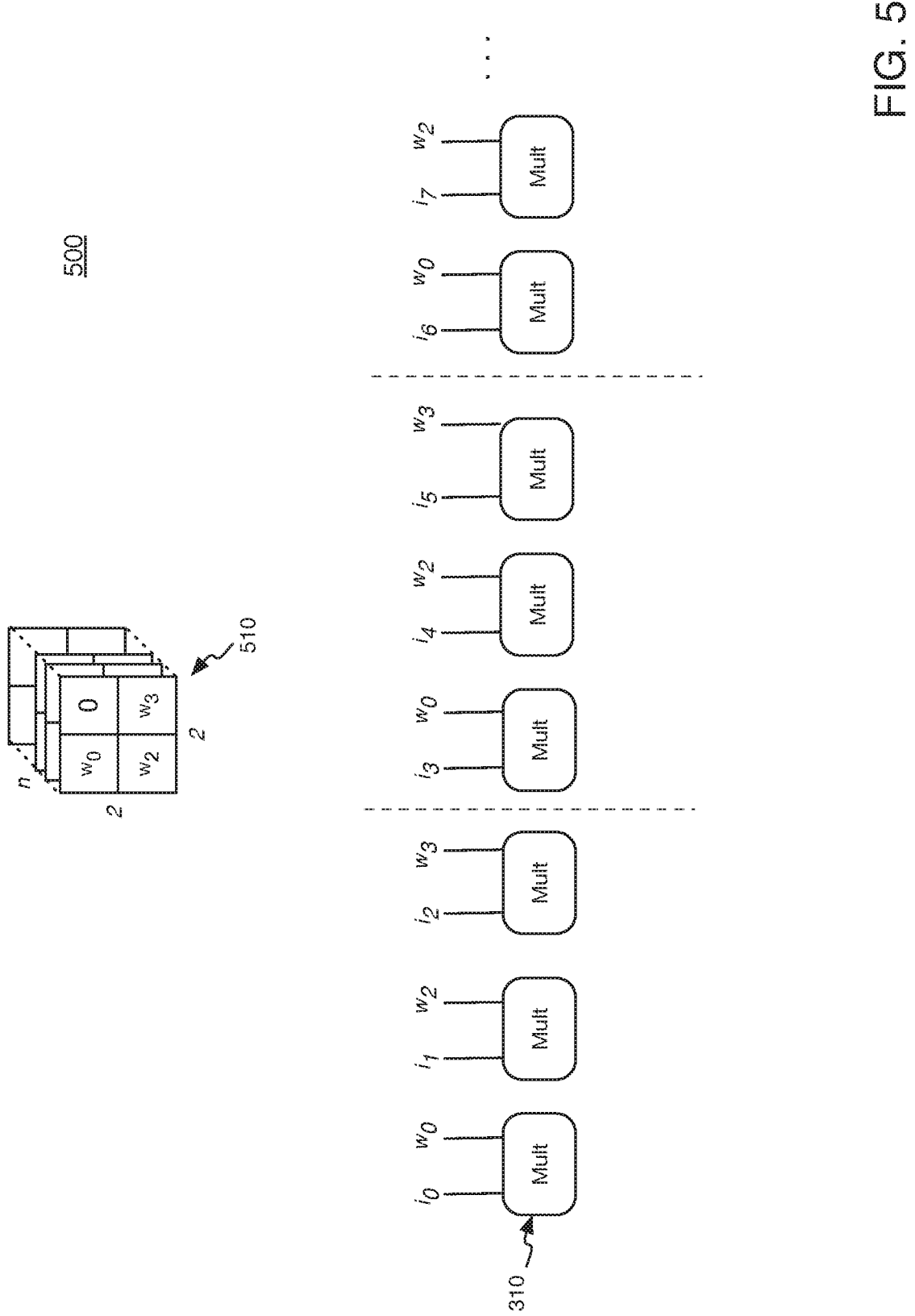
FIG. 5 is an illustration depicting an example reduced kernel slice mapped onto example multiplication circuits, in accordance with an embodiment.

FIG. 5 is an illustration depicting an embodiment 500 of an example mapping of a kernel onto an example array of multiplication circuits, such as multiplication circuits 310. For the example illustrated in FIG. 5, kernel slice 510 includes weight parameters $w_0$, $w_1$, $w_2$, and $w_3$, for example. A set of input parameters (e.g., input feature map) may include input parameters $i_0$, $i_1$, . . . , $i_y$. However, for the example illustrated in FIG. 5, a determination may have been made, such as by a device driver for NNA 200, for example, that $w_1$ comprises a "0" value. In response to determining that $w_1$ comprises a "0" value, a device driver, such as a device driver for NNA 200, may identify a reduced kernel comprising non-zero weight parameters $w_0$, $w_2$, and $w_3$, for example. In an embodiment, a reduced kernel may be mapped across multiplication circuits 310 as indicated. In an embodiment, because a device driver, for example, may map a smaller kernel across the same number of multiplication circuits, a greater number of concurrent mappings are possible. For example, whereas a four-parameter kernel may be mapped one hundred twenty-eight times across an array of five-hundred twelve multiplication circuits, a three-parameter kernel may be mapped one hundred seventy times. That is, in an embodiment, rather than applying a kernel to one hundred twenty eight sets of input parameters concurrently, by reducing the size of a kernel—made possible by the existence of a "0" value in one or more of the weight parameters—a reduced kernel may be applied to one hundred seventy sets of input parameters concurrently. In this manner, individual kernels may be applied to an array of input parameters in a shorter amount of time, for example. Because fewer multiplications involving a value of "0" are performed, an increase in efficiency with respect to computing resource utilization may be realized, for example.

Figure 6:
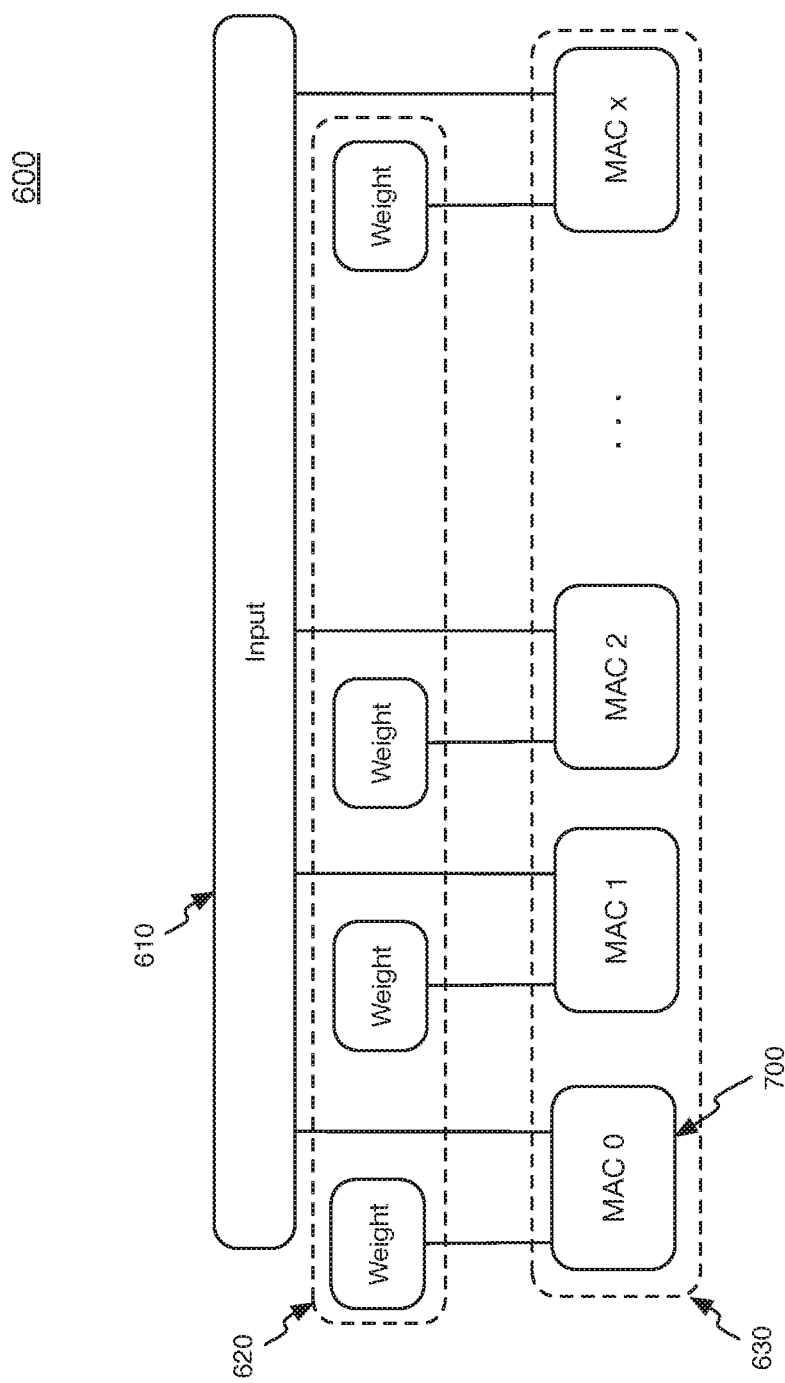
FIG. 6 is an illustration depicting example circuitry for operating on neural network parameters, in accordance with an embodiment.
Figure 7:
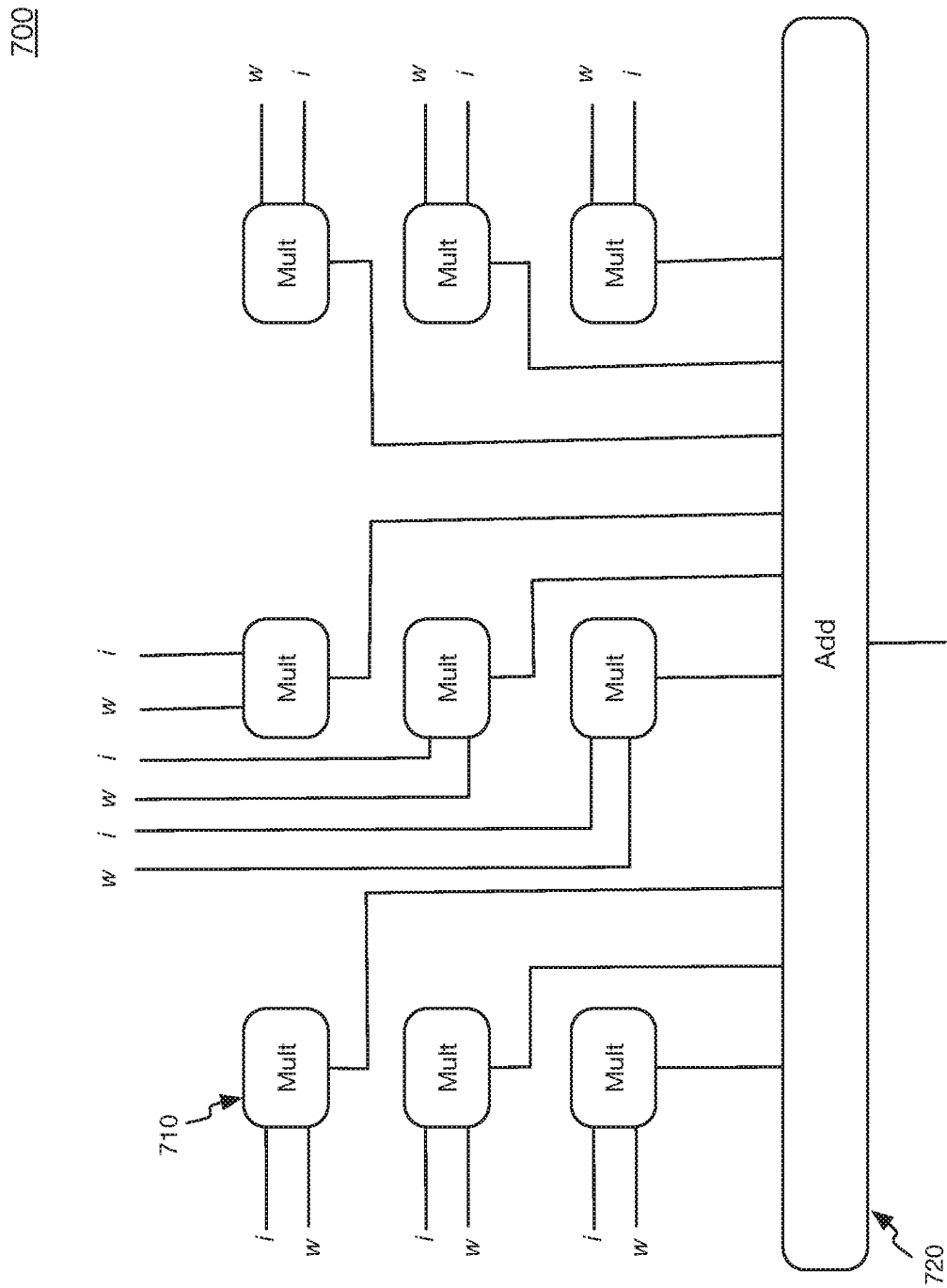
FIG. 7 is a schematic diagram illustrating example MAC circuitry, in accordance with an embodiment.

FIG. 6 is an illustration depicting an embodiment 600 of an example 2D MAC array. FIG. 7 depicts an embodiment 700 of an example 2D MAC unit. In an embodiment, a 2D MAC array may include a plurality of 2D MAC units, such as MAC units 630, including 2D MAC unit 700. In an embodiment, 2D MAC unit 700 may comprise a 3×3 2D MAC array, including a 3×3 array of multiplication units 710. In an embodiment, 2D MAC unit 700 may also include one or more rows of adder circuits, such as adder circuits 720. In an embodiment, multiple 2D MAC arrays may be implemented. For example, in an embodiment, MAC array 630 may include sixteen 2D MAC array units, although claimed subject matter is not limited in scope in these respects. For an embodiment in which sixteen 3×3 2D MAC arrays are utilized, one-hundred forty-four individual multiplication circuits may be available.

Although example 2D MAC unit 700 is depicted as including a 3×3 array of multiplication units, other embodiments may incorporate larger arrays of multiplication units (e.g., 6×6 array), although claimed subject matter is not limited in scope to any particular size of array. Also, claimed subject matter is not limited with respect to the particular number of 2D MAC arrays implemented, for example.

As depicted in FIG. 7, individual multiplication circuits 710 may receive as inputs one or more input parameters i and/or one or more weight parameters w. In an embodiment, input parameters may be provided to multiplication circuits 710 from input parameter storage buffers, such as storage buffers 610. In an embodiment, a device driver executed by a processor, such as a device driver for NNA 200 executed by processor 160, may control access to input parameter storage buffers 610, and/or may further control which input parameters are provide to which multiplication units, for example. Similarly, weight parameters may be provided to multiplication circuits 710 from weight parameter storage buffers, such as storage buffers 620, under control of a device driver executed by processor 160. Further, in an embodiment, weight parameters and/or input parameters may be mapped to particular 2D MAC units and/or to particular multiplication circuits with particular 2D MAC units.

Figure 8:
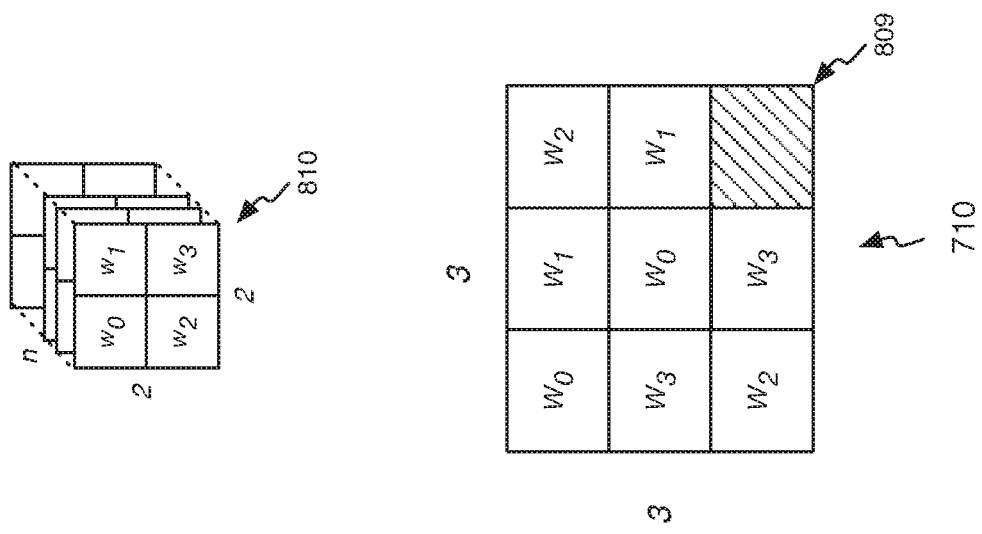
FIG. 8 is an illustration depicting an example kernel slice mapped onto example multiplication circuits, in accordance with an embodiment.

FIG. 8 is an illustration depicting an embodiment 800 of an example mapping of a kernel onto an example 2D array of multiplication circuits, such as 2D array 710. FIG. 8 depicts a 3D kernel and a 2D slice 810 of the larger 3D kernel. As illustrated in FIG. 8, kernel slice 810 includes weight parameters $w_0$, $w_1$, $w_2$, and $w_3$, for example. In an embodiment, for circumstances in which weight parameters $w_0$, $w_1$, $w_2$, and $w_3$ respectively include non-zero values, and/or for circumstances wherein no determination is made as to whether weight parameters $w_0$, $w_1$, $w_2$, and $w_3$ include "0" values, all of weight values $w_0$, $w_1$, $w_2$, and $w_3$ of kernel slice 810 may be mapped across a 3×3 array of multiplication circuits 710 as indicated, wherein the mapping results in a repeating pattern including all four weight parameters $w_0$, $w_1$, $w_2$, and $w_3$, with a ninth multiplication circuit 809 remaining unused. For this example, a 2×2 kernel may not map efficiently onto a 3×3 array of multiplication circuits because one of the circuits may be left unused, in at least some circumstances. In embodiments implementing sixteen 3×3 MAC arrays, providing 144 multiplication circuits, kernel slice 810 may be mapped across multiplication circuits 710 a total of 32 times. For example, for each of the sixteen 3×3 arrays, kernel slice 810 may be applied twice, and kernel slice 810 may be applied to thirty two sets of input parameters concurrently.

Figure 9:
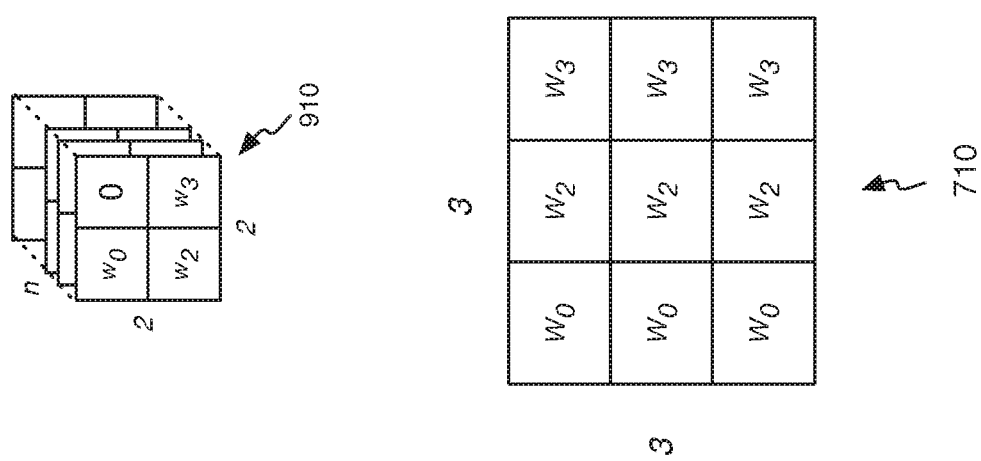
FIG. 9 is an illustration depicting an example reduced kernel slice mapped onto example multiplication circuits, in accordance with an embodiment.

In contrast, FIG. 9 depicts an embodiment 500 of an example mapping of a kernel, such as kernel slice 910, onto an example array of multiplication circuits, such 3×3 2D array of multiplication circuits 710. For the example illustrated in FIG. 9, kernel slice 910 includes weight parameters $w_0$, $w_1$, $w_2$, and $w_3$, for example. However, for the example illustrated in FIG. 9, a determination may have been made, such as by a device driver for NNA 200, for example, that $w_1$ comprises a "0" value. In response to determining that $w_1$ comprises a "0" value, a device driver, such as a device driver for NNA 200, may identify a reduced kernel comprising non-zero weight parameters $w_0$, $w_2$, and $w_3$, for example, and may map the reduced kernel across multiplication circuits 710 as indicated.

In this example, because the device driver is able to map a smaller kernel across the same number of multiplication circuits, a greater number of concurrent mappings are possible. For example, whereas a four-parameter kernel may be mapped only twice onto a 3×3 array of multiplication units, a three-parameter kernel may be mapped three times. That is, in an embodiment, rather than applying a kernel to 32 sets of input parameters concurrently, by reducing the size of a kernel—made possible by the existence of a "0" value in one or more of the weight parameters—the reduced kernel may be applied to forty eight sets of input parameters concurrently. Again, because fewer multiplications involving a value of "0" are performed, an increase in efficiency with respect to computing resource utilization may be realized, for example. Also, even in situations in which more kernels may not be mapped onto a set of input parameters, elimination of parameters (e.g., weight parameters having values of "0") may reduce power consumption as a result of a reduction in fetches from memory and/or as a result of a reduction in processing, for example.

Of course, claimed subject matter is not limited to the specific sizes of kernels, kernel slices, MAC arrays, etc. Also, although examples are provided herein showing kernel slices having a single "0" value, embodiments may accommodate any number of "0" values within a kernel. For the example depicted in FIGS. 8 and 9 discussed above, if a determination is made that two weight parameters in kernel slice 910 comprise "0" values, a reduced kernel having two non-zero weight parameters may be mapped four times per respective 3×3 MAC units.

Additionally, in an embodiment, non-zero weight parameters having values below a specified threshold, for example, may be identified and/or may be eliminated from particular kernels. For example, a device driver may analyze a neural network to identify weight parameters having values that are relatively very small (e.g., determined to fall below a specified threshold), and/or may eliminate the identified weight parameters. By identifying and/or eliminating weight parameters having values that fall below a specified threshold in addition to weight parameters having values of "0", kernels may be further reduced, potentially resulting in an additional increase in efficiency with respect to computing resource utilization, for example. In an embodiment, elimination of weight parameters having non-zero values may affect neural network results and/or may also reduce an amount of processing, for example.

Figure 10:
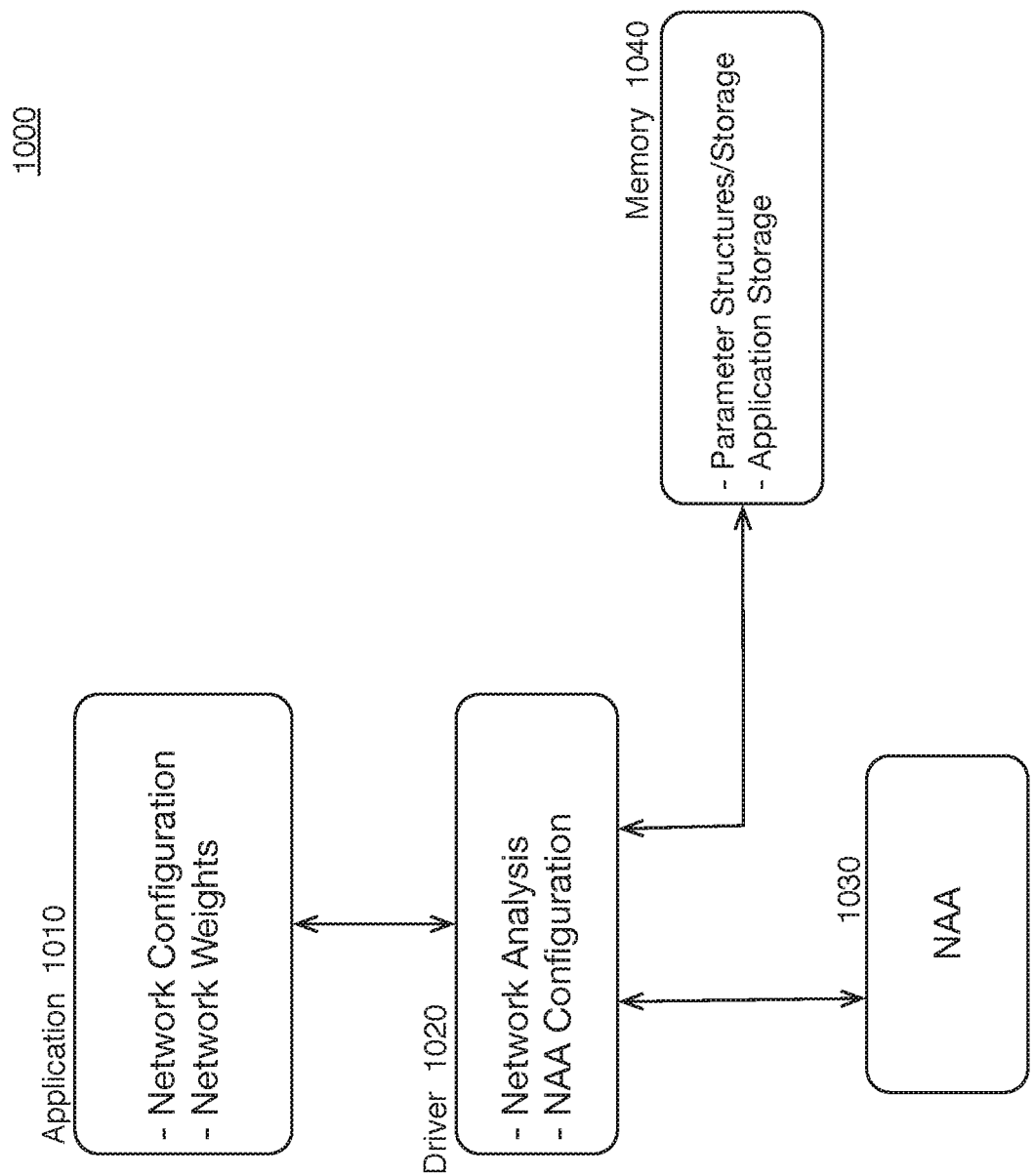
FIG. 10 is an illustration depicting example operations to configure circuitry to process neural network parameters, in accordance with an embodiment.

FIG. 10 is an illustration depicting an embodiment 1000 of example operations to process neural network parameters. In an embodiment, a software application, such as application 1010, may implement operations to configure a neural network, including training operations, for example, to determine network weight parameter values. In an embodiment, application 1010 may be executed by a processor, such as processor 160, and/or may be executed in conjunction with an operating system, for example. Also, in an embodiment, a device driver, such as device driver 1020, may implement processes to analyze a neural network, and/or may implement operations to configure one or more aspects of computing device hardware, such as example NNA 1030, for example. In an embodiment, NNA 1030 may include aspects and/or characteristics similar to those discussed above in connection with NNA 200. For example, NNA 1030 may include one or more MAC arrays, for example.

As mentioned, application 1010, for example, may configure a neural network and/or may perform training operations to determine weight parameter values for the neural network. Device driver 1020, for example, executed by a processor, such as processor 160, may analyze weight parameters previously determined by application 1010, for example, and may identify a number of static weight parameters. Device driver 1020, for example, may also determine which of the static weight parameters comprise values of "0." In an embodiment, based at least in part on the identification of static weight parameters having "0" values, device driver 1020, for example, may configure one or more aspects of NNA 1030, for example, and/or may generate content structures and/or executable instructions to be stored in a memory, such as memory 1040. For example, in an embodiment, device driver 1020, for example, executed by processor 160, for example, may organize weight parameters within a memory, such as memory 1040, based at least in part on particular mappings determined by the device driver to be advantageous given particular weight parameter values configured by application 1010 and/or given available circuitry, for example. In an embodiment, a memory, such as memory 1040, may also store signals and/or states representative of executable instructions for one or more software applications, such as application 1010, for example. In an embodiment, a processor, such as processor 160, may execute application 1010, for example, and/or may control access to a memory, such as memory 1040, for example.

Additionally, a device driver, such as device driver 1020, for example, may configure one or more aspects of hardware circuitry, such as one or more aspects of NNA 1030. For example, NNA 1030, for example, may, in an embodiment, include configurable functional units. For example, as mentioned, one or more rows of adders may be bypassed. Also, NNA 1030 may include multiple multiplication units, for example, that may be reconfigured. In an embodiment, electrically conductive lines interconnecting a particular configuration of multiplication units may be re-programmed, such as via switching devices (e.g., transistors), for example, to interconnect a different particular configuration of multiplication units. In an embodiment, device driver 1020, for example, may reconfigure one or more multiplication units within NNA 1030 based, at least in part, on an analysis of a neural network previously configured by application 1010, as mentioned previously.

Although embodiment 1000 is described has having a device driver, executed by a processor, perform a neural network analysis, claimed subject matter is not limited in scope in this respect. For example, as mentioned, neural network analysis may be performed by a separate computing device, in an embodiment. Analysis results may be obtained from a separate computing device (e.g., signal packets may be received at communication interface 180), and/or may be stored in a memory (e.g., memory 120), for example.

Figure 11:
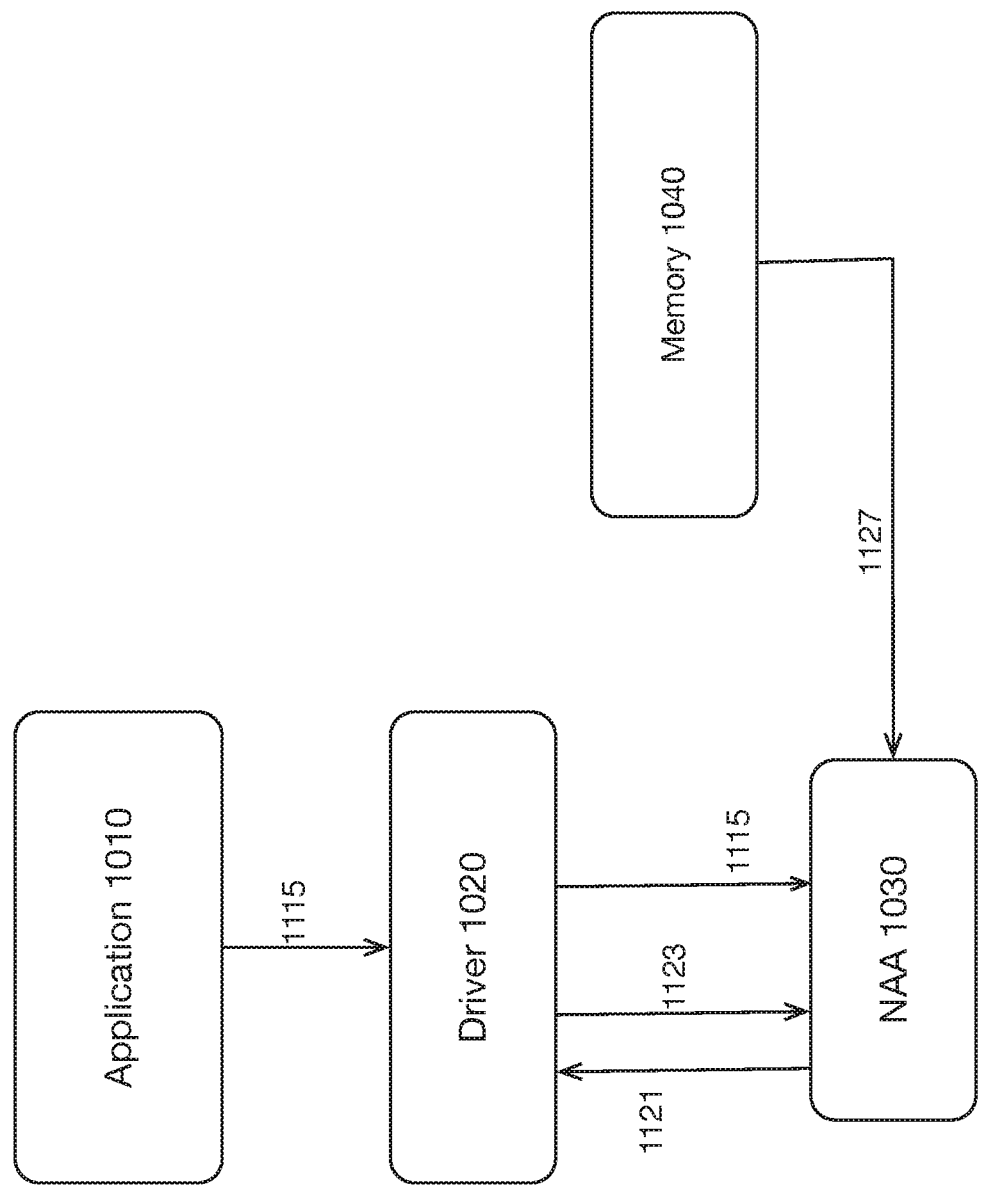
FIG. 11 is an illustration depicting example operations to process neural network parameters, in accordance with an embodiment.

FIG. 11 is an illustration depicting an embodiment 1100 of example operations to process neural network parameters. While the example depicted in FIG. 10 and discussed above is directed at configuring a neural network and/or configuring hardware circuitry to perform neural network operations, the example depicted in FIG. 11 is directed to execution of a neural network. The various arrows depicted in FIG. 11 are meant to represent communications, in the form of signals and/or signal packets, communicated between devices and/or between software agents (e.g., application 1010 and/or device driver 1020) within a computing device, such as computing device 100, responsive to a processor, such as processor 160, executing application 1010. For example, application 1010 may, if executed by processor 160, may execute a neural network, utilizing weight parameters, for example, determined during previous training operations.

In an embodiment, device driver 1020 may control access to NAA 1030. In an embodiment, application 1010 may make a call to device driver 1020, for example, in an attempt to access NAA 1030 to perform multiply-and-accumulate operations, for example. In an embodiment, application 1010 may communicate with driver 1020 via an operating system also executed by processor 160, for example. In an embodiment, device driver 1020 may obtain input parameters 1115 responsive to a request issued by application 1010. For example, device driver 1020 may obtain input parameters (e.g., image content) from a memory, such as memory 1040. Device driver may further provide input parameters 1115 to NAA 1030, in an embodiment. In another embodiment, device driver 1020 may specify to NAA 1030 particular weight parameters to retrieve from particular locations within memory 1040, for example, and may further specify particular mappings of particular weight parameters to particular functional units within NAA 1030. Also, in an embodiment, device driver 1020 may provide configuration messages 1123 to NAA 1030. NAA 1030 may provide status signals and/or messages to device driver 1020. Further, in an embodiment, NAA 1030 may obtain weight parameters 1127 and/or other content from memory 1040. In an embodiment, NAA 1030 may also write content (e.g., output parameters) back to memory 1040, for example. In an embodiment, for a situation in which NNA 1030, for example, includes buffer storage insufficient to store content, such as weight parameters for a particular layer, for example, some content may be temporarily stored in a memory, such as memory 1040, and/or may be accessed by NNA 1030, for example.

Figure 12:
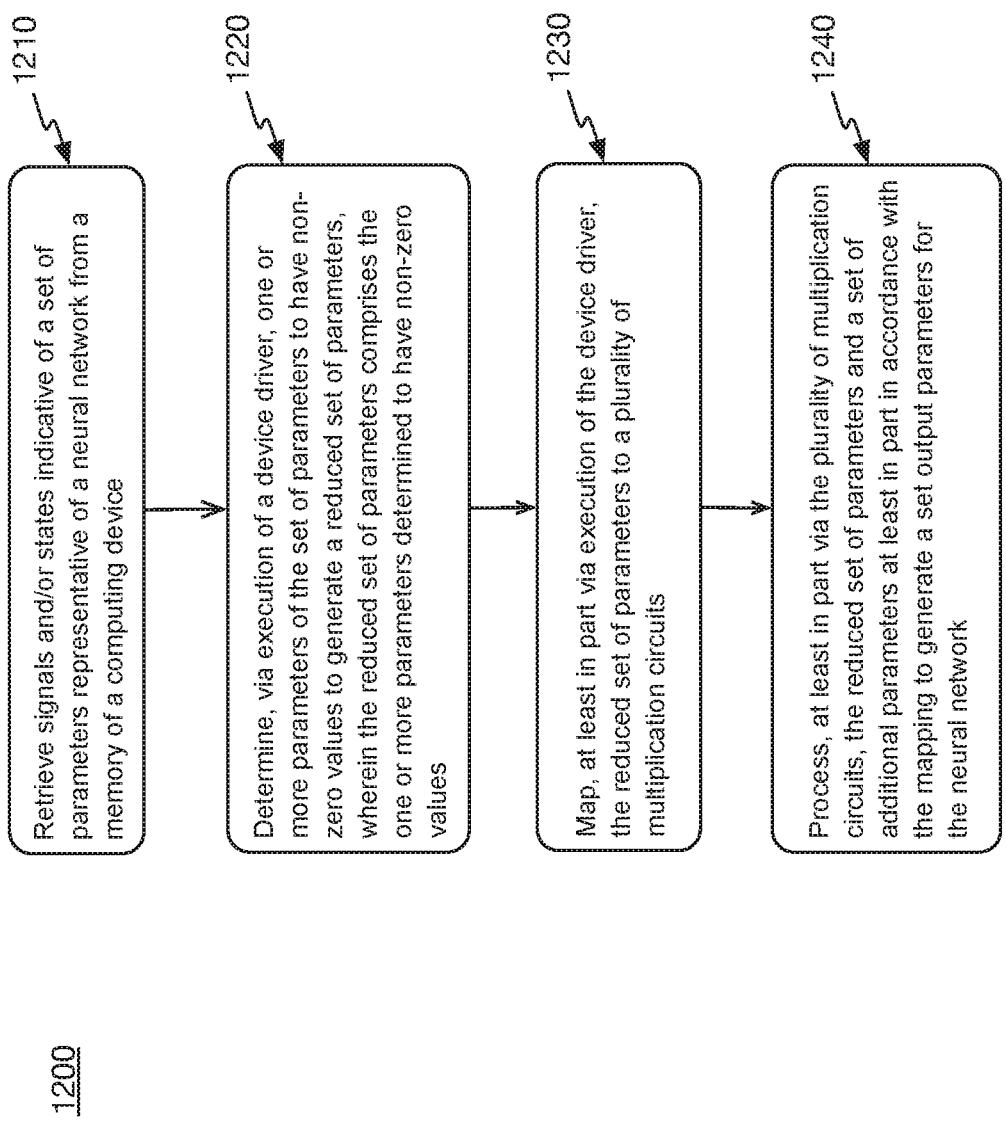
FIG. 12 is a schematic block diagram illustrating an example process for configuring circuitry to process neural network parameters, in accordance with an embodiment.

FIG. 12 is a schematic block diagram illustrating an embodiment 1200 of an example process for configuring circuitry to process neural network parameters. In an embodiment, signals and/or states indicative of a set of parameters representative of a neural network may be obtained from a memory of a computing device, as depicted at block 1210. For example, a device driver, executed by a processor, such as processor 160, may obtain neural network parameters (e.g., weight parameters, input parameters, etc.) from a memory, such as memory 120. In an embodiment, neural network parameters may comprise weight parameters that may have previously undergone neural network training operations, although claimed subject matter is not limited in scope in this respect. As further indicated at block 1220, for example, at least in part via a device driver executed by a processor of the computing device, one or more parameters of a set of neural network parameters to have non-zero values may be determined. Further, a device driver, executed by a processor such as processor 160, may identify a reduced set of weight parameters. In an embodiment, the reduced set of parameters may comprise the one or more parameters determined to have non-zero values, in an embodiment.

In an embodiment, a device driver, executed by a processor, such as processor 160, may map a reduced set of parameters to a plurality of multiplication circuits of the computing device, as indicated at block 1230. For example, as discussed above, a device driver, such as a device driver pertaining to neural network acceleration circuitry 200 and/or 1030, for example, based at least in part on a determination of available computing resources and based at least in part on an analysis of neural network parameters determined to have values of "0," for example, may map a reduced set of neural network parameters to an available plurality of multiplication units, such as multiplication units 310 and/or 710, for example. In an embodiment, because a device driver, for example, is able to map a reduced set of parameters, such as a reduced kernel for example, across a given number of multiplication circuits, such as multiplication circuits 310 and/or 710, a greater number of concurrent mappings are possible. Further, as depicted at block 1240, a reduced set of neural network parameters, such as a reduced kernel comprising non-zero weight parameters, for example, and a set of additional parameters (e.g., input parameters) may be processed at least in part via the plurality of multiplication circuits, such as circuits 310 and/or 710, for example, at least in part in accordance with the mapping to generate a set output parameters for the neural network. As seen in the examples discussed above, mappings involving reduced sets of parameters, such as by eliminating static weight parameters having a value of "0," may allow a device driver for a neural network accelerator, such as NAA 200 and/or 1030, for example, to more advantageously map the parameters across available multiplication units, such as multiplication units 310 and/or 710, as explained more fully above.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, which generally refers to the ability for the client and server to transmit, receive, and/or exchange communications, as discussed in more detail later. Also, the term "connection" may be utilized in a context of a neural network model, and may, in an embodiment, refer to parameters passed between nodes that may include parameters and/or sets of parameters representative of input values, output values, etc., for example. Also, in an embodiment, connections between nodes may include weight parameters. For example, one or more weight parameters may operate in a specified manner on one or more parameters representative of one or more output values to yield a connection, such as between a node of a first layer and a node of a second layer, in an embodiment, for example.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled" is used to mean that potentially two or more tangible components are tangibly in direct physical contact. Nonetheless, it is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Additionally, in the present patent application, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance, between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, to be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall with the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modeled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device and/or a client device, as well as other types of devices, including between wired and/or wireless devices coupled via a wired and/or wireless network, for example. An example of a distributed computing system comprises the so-called Hadoop distributed computing system, which employs a map-reduce type of architecture. In the context of the present patent application, the terms map-reduce architecture and/or similar terms are intended to refer to a distributed computing system implementation and/or embodiment for processing and/or for generating larger sets of signal samples employing map and/or reduce operations for a parallel, distributed process performed over a network of devices. A map operation and/or similar terms refer to processing of signals (e.g., signal samples) to generate one or more key-value pairs and to distribute the one or more pairs to one or more devices of the system (e.g., network). A reduce operation and/or similar terms refer to processing of signals (e.g., signal samples) via a summary operation (e.g., such as counting the number of students in a queue, yielding name frequencies, etc.). A system may employ such an architecture, such as by marshaling distributed server devices, executing various tasks in parallel, and/or managing communications, such as signal transfers, between various parts of the system (e.g., network), in an embodiment. As mentioned, one non-limiting, but well-known, example comprises the Hadoop distributed computing system. It refers to an open source implementation and/or embodiment of a map-reduce type architecture (available from the Apache Software Foundation, 1901 Munsey Drive, Forrest Hill, MD, 21050-2747), but may include other aspects, such as the Hadoop distributed file system (HDFS) (available from the Apache Software Foundation, 1901 Munsey Drive, Forrest Hill, MD, 21050-2747). In general, therefore, "Hadoop" and/or similar terms (e.g., "Hadoop-type," etc.) refer to an implementation and/or embodiment of a scheduler for executing larger processing jobs using a map-reduce architecture over a distributed system. Furthermore, in the context of the present patent application, use of the term "Hadoop" is intended to include versions, presently known and/or to be later developed.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

The term electronic file and/or the term electronic document and/or the like may be used in this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

In the context of the present patent application, the terms "entry," "electronic entry," "document," "electronic document," "content,", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular patent application, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, or 4th generation (2G, 3G, or 4G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), 802.11b/g/n, and/or the like. A wireless network may include virtually any type of now known and/or to be developed wireless communication mechanism and/or wireless communications protocol by which signals may be communicated between devices, between networks, within a network, and/or the like, including the foregoing, of course.

Figure 13:
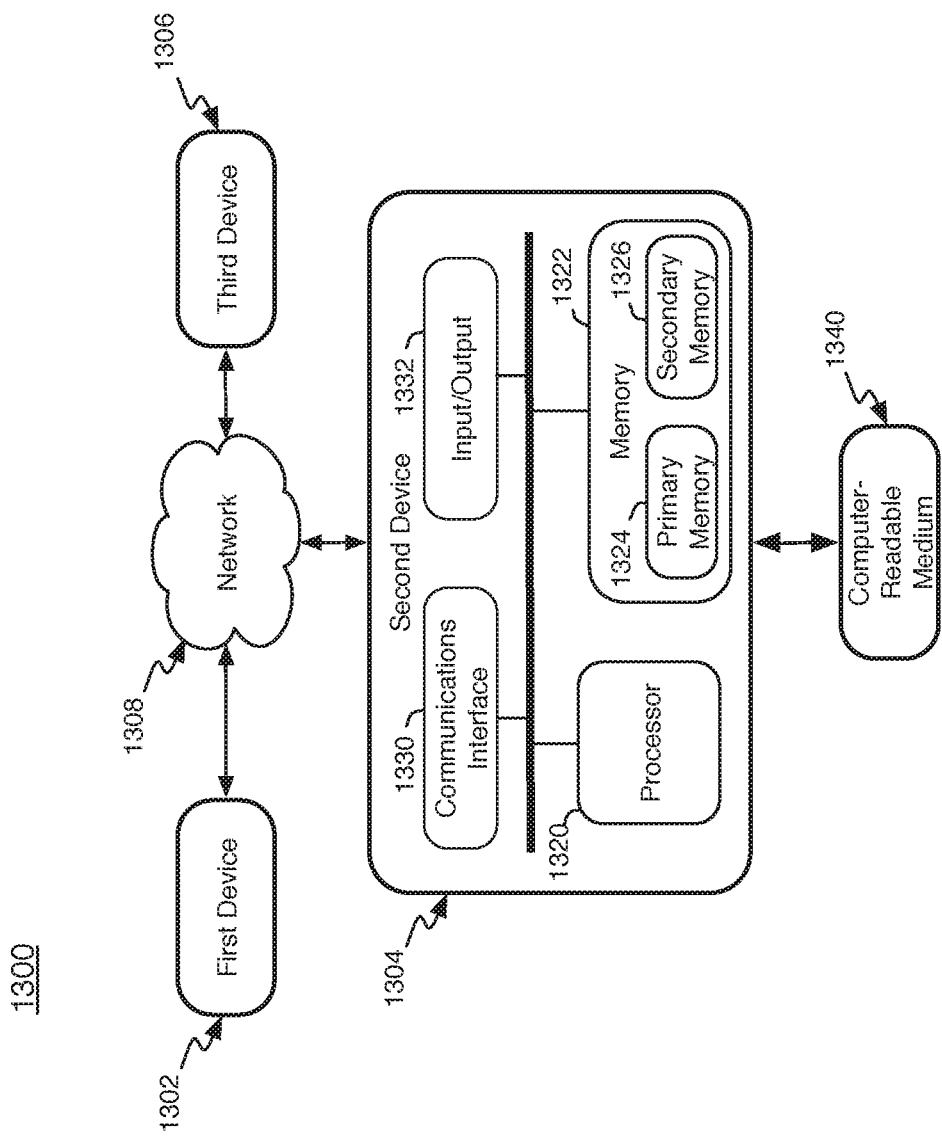
FIG. 13 is a schematic block diagram of an example computing device, in accordance with an embodiment.

In one example embodiment, as shown in FIG. 13, a system embodiment may comprise a local network (e.g., device 1304 and medium 1340) and/or another type of network, such as a computing and/or communications network. For purposes of illustration, therefore, FIG. 13 shows an embodiment 1300 of a system that may be employed to implement either type or both types of networks. Network 1308 may comprise one or more network connections, links, processes, services, applications, and/or resources to facilitate and/or support communications, such as an exchange of communication signals, for example, between a computing device, such as 1302, and another computing device, such as 1306, which may, for example, comprise one or more client computing devices and/or one or more server computing device. By way of example, but not limitation, network 1308 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 13 may comprise features, for example, of a client computing device and/or a server computing device, in an embodiment. One or more computing devices, such as computing devices 1302, 1304, and/or 1306, for example, may be utilized in various embodiments, including example embodiments described herein in connection with FIGS. 1-12. It is further noted that the term computing device, in general, whether employed as a client and/or as a server, or otherwise, refers at least to a processor and a memory connected by a communication bus. Likewise, in the context of the present patent application at least, this is understood to refer to sufficient structure within the meaning of 35 USC § 112 (f) so that it is specifically intended that 35 USC § 112 (f) not be implicated by use of the term "computing device" and/or similar terms; however, if it is determined, for some reason not immediately apparent, that the foregoing understanding cannot stand and that 35 USC § 112 (f), therefore, necessarily is implicated by the use of the term "computing device" and/or similar terms, then, it is intended, pursuant to that statutory section, that corresponding structure, material and/or acts for performing one or more functions be understood and be interpreted to be described at least in FIGS. 1-12, for example, and in the text associated with the foregoing figure(s) of the present patent application.

An embodiment in accordance with claimed subject matter may include a method for configuring circuitry to perform neural network operations. In an embodiment, signals and/or states indicative of a set of parameters representative of a neural network may be obtained from a memory of a computing device. At least in part via a device driver executed by a processor of the computing device, one or more parameters of the set of parameters to have non-zero values may be determined, and a reduced set of parameters may be identified, wherein the reduced set of parameters includes the one or more parameters determined to have non-zero values, in an embodiment. Further, for example, the device driver, executed by the processor, may map the reduced set of parameters to a plurality of multiplication circuits of the computing device, and the reduced set of parameters and a set of additional parameters may be processed at least in part via the plurality of multiplication circuits and at least in part in accordance with the mapping to generate a set output parameters for the neural network.

Additionally, in an embodiment, the set of parameters representative of the neural network may comprise a set of input parameters representative of image content, for example, and/or the set of parameters representative of the neural network may comprise a set of trained weight parameters representative of the neural network. Further, for example, the reduced set of parameters may comprise one or more reduced kernel slices comprising trained weight parameters having non-zero values. Also, in an embodiment, the one or more reduced kernel slices may comprise one or more two-dimensional slices of one or more three-dimensional kernels. In an embodiment, the set of additional parameters representative of the neural network may comprise a set of input parameters, and/or mapping the one or more reduced set of parameters to the plurality of multiplication circuits may include mapping the set of input parameters and the reduced kernel slices to the plurality of multiplication circuits. Also, for example, processing the one or more reduced set of parameters and the set of input parameters may include storing the one or more reduced kernel slices and the one or more input parameters in one or more buffers at least in part in accordance with the mapping. Further, in an embodiment, mapping may also comprise assigning, at least in part via the device driver executed by the processor, particular combinations of the one or more reduced kernel slices and the one or more input parameters to particular multiplication units of the plurality of multiplication units. For example, assigning the particular combinations of the one or more reduced kernel slices and the one or more input parameters to the plurality of multiplication circuits may include analyzing, at least in part via the device driver executed by the processor, the one or more reduced kernel slices, the one or more input parameters, and the plurality of multiplication circuits to determine an increased-efficiency mapping. Also, in an embodiment, analyzing the one or more reduced kernel slices, the one or more input parameters, and the plurality of multiplication circuits to determine the increased-efficiency mapping may include determining an amount of available multiplication circuits and/or determining how many copies of the one or more reduced kernel slices can be assigned to the available multiplication circuits concurrently. Additionally, an embodiment may comprise configuring, at least in part via the device driver executed by the processor, the plurality of multiplication circuits based at least in part on the mapping to enable the processing the reduced set of parameters and the set of additional parameters to generate the set output parameters for the neural network. In an embodiment, the set of additional parameters may include parameters indicative of one or more images. Further, for example, processing the reduced set of parameters and the set of additional parameters to generate the set output parameters for the neural network may include generating a set of output parameters indicative of an output feature map representative of the neural network. Also, in an embodiment, the neural network may be directed to one or more computer vision applications.

An example embodiment may include an apparatus, comprising a memory device to store signals and/or states indicative of a set of parameters representative of a neural network, a plurality of multiplication circuits, and at least one processor to execute a device driver to configure the plurality of multiplication circuits to process the set of parameters. In an embodiment, the processor may obtain, at least in part via execution of the device driver, signals and/or states representative of the set of parameters from the memory device, determine, at least in part via execution of the device driver, one or more parameters of the set of parameters to have non-zero values to identify a reduced set of parameters, wherein the reduced set of parameters comprises the one or more parameters determined to have non-zero values, map, at least in part via execution of the device driver, the reduced set of parameters to the plurality of multiplication circuits, and initiate processing the reduced set of parameters and a set of additional parameters at least in part via a plurality of multiplication circuits and at least in part in accordance with the mapping to generate a set output parameters for the neural network. In an embodiment, the set of parameters representative of the neural network may comprise a set of input parameters. The set of parameters representative of the neural network may further comprise a set of trained weight parameters representative of the neural network, for example. In an embodiment, a reduced set of weight parameters may include one or more reduced kernel slices comprising trained weight parameters having non-zero values. The one or more reduced kernel slices may comprise one or more two-dimensional slices of one or more three-dimensional kernels, for example. In an embodiment, a set of additional parameters representative of the neural network may comprise a set of input parameters. The processor may map the one or more reduced set of parameters to the plurality of multiplication circuits at least in part by mapping the set of input parameters and the reduced kernel slices to the plurality of multiplication circuits, in an embodiment. Further, in an embodiment, the processor may initiate processing the one or more reduced set of parameters and the set of input parameters at least in part by initiating storing the one or more reduced kernel slices and the one or more input parameters in one or more buffers at least in part in accordance with the mapping. In an embodiment, the processor may map the reduced set of parameters to the plurality of multiplication circuits at least in part by assigning, at least in part via execution of the device driver, particular combinations of the one or more reduced kernel slices and the one or more input parameters to particular multiplication units of the plurality of multiplication units. Also, in an embodiment, a processor, executing a device driver, for example, may assign particular combinations of the one or more reduced kernel slices and one or more input parameters to a plurality of multiplication circuits at least in part by analyzing the one or more reduced kernel slices, the one or more input parameters, and the plurality of multiplication circuits to determine an increased-efficiency mapping. In an embodiment, a processor, executing a device driver, may analyze the one or more reduced kernel slices, the one or more input parameters, and the plurality of multiplication circuits to determine the increased-efficiency mapping at least in part by determining an amount of available multiplication circuits and at least in part by determining how many copies of the one or more reduced kernel slices can be assigned to the available multiplication circuits concurrently. The processor may further configure, at least in part via execution of the device driver, the plurality of multiplication circuits based at least in part on the mapping. In an embodiment, the set of additional parameters may comprise parameters indicative of one or more images, and wherein the processor may initiate processing of the reduced set of parameters and the set of additional parameters to generate the set output parameters for the neural network at least in part by generating a set of output parameters indicative of an output feature map representative of the neural network.

Referring now again to FIG. 13, in an embodiment, first and third devices 1302 and 1306 may be capable of rendering a graphical user interface (GUI) for a network device and/or a computing device, for example, so that a user-operator may engage in system use. Device 1304 may potentially serve a similar function in this illustration. Likewise, in FIG. 13, computing device 1302 ('first device' in figure) may interface with computing device 1304 ('second device' in figure), which may, for example, also comprise features of a client computing device and/or a server computing device, in an embodiment. Processor (e.g., processing device) 1320 and memory 1322, which may comprise primary memory 1324 and secondary memory 1326, may communicate by way of a communication bus 1315, for example. The term "computing device," in the context of the present patent application, refers to a system and/or a device, such as a computing apparatus, that includes a capability to process (e.g., perform computations) and/or store digital content, such as electronic files, parameters, electronic documents, measurements, text, images, video, audio, etc. in the form of signals and/or states. Thus, a computing device, in the context of the present patent application, may comprise hardware, software, firmware, or any combination thereof (other than software per se). Computing device 1304, as depicted in FIG. 13, is merely one example, and claimed subject matter is not limited in scope to this particular example.

As mentioned, for one or more embodiments, a computing device may comprise, for example, any of a wide range of digital electronic devices, including, but not limited to, desktop and/or notebook computers, high-definition televisions, optical disc players and/or recorders, game consoles, satellite television receivers, cellular telephones, tablet devices, wearable devices, personal digital assistants, mobile audio and/or video playback and/or recording devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, Flickr, and/or Google+, to provide only a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 13, computing device 1302 may provide one or more sources of executable computer instructions in the form physical states and/or signals (e.g., stored in memory states), for example. Computing device 1302 may communicate with computing device 1304 by way of a network connection, such as via network 1308, for example. As previously mentioned, a connection, while physical, may not necessarily be tangible. Although computing device 1304 of FIG. 13 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 1322 may comprise any non-transitory storage mechanism. Memory 1322 may comprise, for example, primary memory 1324 and secondary memory 1326, additional memory circuits, mechanisms, or combinations thereof may be used. Memory 1322 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 1322 may be utilized to store a program of executable computer instructions. For example, processor 1320 may fetch executable instructions from memory and proceed to execute the fetched instructions. Memory 1322 may also comprise a memory controller for accessing device readable-medium 1340 that may carry and/or make accessible digital content, which may include code, and/or instructions, for example, executable by processor 1320 and/or some other device, such as a controller, as one example, capable of executing computer instructions, for example. Under direction of processor 1320, a non-transitory memory, such as memory cells storing physical states (e.g., memory states), comprising, for example, a program of executable computer instructions, may be executed by processor 1320 and able to generate signals to be communicated via a network, for example, as previously described. Generated signals may also be stored in memory, also previously suggested.

Memory 1322 may store electronic files and/or electronic documents, such as relating to one or more users, and may also comprise a computer-readable medium that may carry and/or make accessible content, including code and/or instructions, for example, executable by processor 1320 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 13, processor 1320 may comprise one or more circuits, such as digital circuits, to perform at least a portion of a computing procedure and/or process. By way of example, but not limitation, processor 1320 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 1320 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 13 also illustrates device 1304 as including a component 1332 operable with input/output devices, for example, so that signals and/or states may be appropriately communicated between devices, such as device 1304 and an input device and/or device 1304 and an output device. A user may make use of an input device, such as a computer mouse, stylus, track ball, keyboard, and/or any other similar device capable of receiving user actions and/or motions as input signals. Likewise, a user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method, comprising:
    obtaining, at a processor of a computing device, signals and/or states indicative of a set of parameters representative of a neural network from a memory of the computing device, wherein the set of parameters representative of the neural network comprises one or more parameters having non-zero values and further comprises one or more parameters having values of zero;
    determining, utilizing the processor of the computing device, a reduced set of parameters comprising the one or more parameters having non-zero values and excluding the one or more parameters having values of zero, wherein the reduced set of parameters comprises one or more two-dimensional reduced kernel slices;
    mapping, utilizing the processor, the one or more two-dimensional reduced kernel slices and one or more input parameters to a plurality of multiplication circuits of the computing device, including providing a first kernel slice of the one or more two-dimensional reduced kernel slices to a first set of multiplication circuits greater in number than a number of multiplication circuits assignable to a non-reduced kernel slice and the one or more input parameters to affect an increase in concurrent multiplication operations across the plurality of multiplication circuits; and
    processing, at least in part via the plurality of multiplication circuits, the one or more two-dimensional reduced kernel slices and the one or more input parameters at least in part in accordance with the mapping to generate a set of output parameters for the neural network.

2. The method of claim 1, wherein the determining the reduced set of parameters includes determining the reduced set of parameters at least in part via a device driver executed by the processor and/or wherein the mapping the one or more two-dimensional reduced kernel slices to the plurality of multiplication circuits includes mapping the one or more two-dimensional reduced kernel slices to the plurality of multiplication circuits at least in part via the device driver executed by the processor.

3. The method of claim 2, further including storing, at least in part via the device driver executed by the processor, an improved-efficiency neural network, including the reduced set of parameters comprising the one or more two-dimensional reduced kernel slices, in the memory of the computing device.

4. The method of claim 2, further including storing, at least in part via the device driver executed by the processor, parameters representative of efficiency improvements including specified hardware configurations and/or the reduced set of parameters in the memory of the computing device.

5. The method of claim 1, wherein the set of parameters representative of the neural network comprises the one or more input parameters, wherein the one or more input parameters comprise one or more input feature maps.

6. The method of claim 1, wherein the set of parameters representative of the neural network comprises the one or more input parameters, wherein the one or more input parameters are representative of image content or audio content, or a combination thereof.

7. The method of claim 1, wherein the set of parameters representative of the neural network comprises a set of trained weight parameters representative of the neural network.

8. The method of claim 1, wherein the one or more two-dimensional reduced kernel slices comprise trained weight parameters having non-zero values.

9. The method of claim 8, wherein the one or more two-dimensional reduced kernel slices comprises one or more slices of one or more three-dimensional kernels.

10. The method of claim 8, wherein the one or more two-dimensional reduced kernel slices further comprise one or more additional weight parameters having non-zero values and/or an input feature map.

11. The method of claim 1, further comprising storing the one or more two-dimensional reduced kernel slices and the one or more input parameters in a storage buffer at least in part in accordance with the mapping.

12. The method of claim 11, wherein the mapping the one or more two-dimensional reduced kernel slices to the plurality of multiplication circuits further comprises assigning, at least in part via a device driver executed by the processor, particular combinations of the one or more two-dimensional reduced kernel slices and the one or more input parameters to particular multiplication units of the plurality of multiplication circuits.

13. The method of claim 12, wherein the assigning the particular combinations of the one or more two-dimensional reduced kernel slices and the one or more input parameters to the particular multiplication units of the plurality of multiplication circuits comprises determining an increased-efficiency mapping at least in part via the device driver executed by the processor analyzing the one or more two-dimensional reduced kernel slices, the one or more input parameters, and the plurality of multiplication circuits.

14. The method of claim 13, wherein the analyzing the one or more two-dimensional reduced kernel slices, the one or more input parameters, and the plurality of multiplication circuits includes determining a number of available multiplication circuits and determining a count of the one or more two-dimensional reduced kernel slices assignable to the available multiplication circuits for concurrent processing.

15. The method of claim 2, further comprising configuring, at least in part via the device driver executed by the processor, the plurality of multiplication circuits based at least in part on the mapping the one or more two-dimensional reduced kernel slices and the one or more input parameters from a storage buffer to the plurality of multiplication circuits to enable the processing of the one or more two-dimensional reduced kernel slices and the one or more input parameters to generate the set of output parameters for the neural network.

16. The method of claim 15, wherein the one or more input parameters comprise parameters indicative of image content or audio content, or a combination thereof, and wherein the processing the one or more two-dimensional reduced kernel slices and the one or more input parameters to generate the set of output parameters for the neural network comprises generating a set of output parameters indicative of an output feature map.

17. The method of claim 16, wherein the neural network is directed to one or more computer vision applications.

18. An apparatus, comprising:
a memory device to store signals and/or states indicative of a set of parameters representative of a neural network, wherein the set of parameters representative of the neural network to comprise one or more parameters having non-zero values and further to comprise one or more parameters having values of zero;
a plurality of multiplication circuits; and
at least one processor to configure the plurality of multiplication circuits to process the set of parameters representative of the neural network, the processor to:
obtain signals and/or states representative of the set of parameters representative of the neural network from the memory device;
determine a reduced set of parameters to comprise the one or more parameters having non-zero values and to exclude the one or more parameters having values of zero, wherein the reduced set of parameters to comprise one or more two-dimensional reduced kernel slices;
map the one or more two-dimensional reduced kernel slices and one or more input parameters to the plurality of multiplication circuits to include delivery of a first kernel slice of the one or more two-dimensional reduced kernel slices to a first set of multiplication circuits greater in number than a number of multiplication circuits assignable to a non-reduced kernel slice and the one or more input parameters to affect an increase in concurrent multiplication operations across the plurality of multiplication circuits; and
initiate processing the one or more two-dimensional reduced kernel slices and one or more input parameters at least in part via the plurality of multiplication circuits and at least in part in accordance with the mapping to generate a set of output parameters for the neural network.

19. The apparatus of claim 18, wherein the processor to:
determine the reduced set of parameters at least in part via execution of a device driver; and/or
map the one or more two-dimensional reduced kernel slices to the plurality of multiplication circuits at least in part via execution of the device driver.

20. The apparatus of claim 19, wherein the processor further to store, via execution of the device driver, an improved-efficiency neural network, to include the one or more two-dimensional reduced kernel slices, in the memory device.

21. The apparatus of claim 19, wherein the processor further to store, via execution of the device driver, parameters representative of efficiency improvements to include specified hardware configurations and/or the one or more two-dimensional reduced kernel slices in the memory device.

22. The apparatus of claim 19, wherein the set of parameters representative of the neural network comprises the one or more input parameters, wherein the one or more input parameters comprise one or more input feature maps.

23. The apparatus of claim 19, wherein the set of parameters representative of the neural network comprises a set of trained weight parameters representative of the neural network.

24. The apparatus of claim 23, wherein the one or more two-dimensional reduced kernel slices to comprise trained weight parameters having non-zero values.

25. The apparatus of claim 24, wherein the one or more two-dimensional reduced kernel slices to comprise one or more slices of one or more three-dimensional kernels.

26. The apparatus of claim 24, wherein the one or more two-dimensional reduced kernel slices further to comprise one or more additional weight parameters having non-zero values and/or an input feature map.

27. The apparatus of claim 25, wherein the processor to initiate processing the one or more two-dimensional reduced kernel slices and the one or more input parameters at least in part by initiating storing the one or more two-dimensional reduced kernel slices and the one or more input parameters in a storage buffer at least in part in accordance with the map of the one or more two-dimensional reduced kernel slices to the plurality of multiplication circuits.

28. The apparatus of claim 27, wherein the processor to map the one or more two-dimensional reduced kernel slices and the one or more input parameters to the plurality of multiplication circuits at least in part by assigning, at least in part via execution of the device driver, particular combinations of the one or more two-dimensional reduced kernel slices and the one or more input parameters to particular multiplication units of the plurality of multiplication circuits.

29. The apparatus of claim 28, wherein the processor to assign the particular combinations of the one or more two-dimensional reduced kernel slices and the one or more input parameters to the plurality of multiplication circuits at least in part by determining an increased-efficiency mapping at least in part via execution of the device driver to analyze the one or more two-dimensional reduced kernel slices, the one or more input parameters, and the plurality of multiplication circuits.

30. The apparatus of claim 29, wherein the processor to determine the increased-efficiency mapping at least in part by determining a count of available multiplication circuits and at least in part by determining a count of the one or more two-dimensional reduced kernel slices assignable to the available multiplication circuits.

31. The apparatus of claim 19, wherein the processor further to configure, at least in part via execution of the device driver, the plurality of multiplication circuits based at least in part on the map of the one or more two-dimensional reduced kernel slices to the plurality of multiplication circuits.

32. The apparatus of claim 31, wherein the one or more input parameters comprise parameters indicative of image content or audio content, or a combination thereof, and wherein the processor to initiate processing the one or more two-dimensional reduced kernel slices and the one or more input parameters to generate the set of output parameters for the neural network at least in part by generating a set of output parameters indicative of an output feature map.

33. The apparatus of claim 32, wherein the neural network is to be directed to one or more computer vision applications.

34. An article, comprising: a non-transitory computer-readable medium to have stored thereon instructions executable by a computing device to:
obtain signals and/or states indicative of a set of parameters representative of a neural network from a memory of the computing device, wherein the set of parameters representative of the neural network to comprise one or more parameters having non-zero values and further to comprise one or more parameters having values of zero;

determine a reduced set of parameters to comprise the one or more parameters having non-zero values and excluding the one or more parameters having values of zero, wherein the reduced set of parameters to comprise one or more two-dimensional reduced kernel slices;

map the one or more two-dimensional reduced kernel slices and one or more input parameters to a plurality of multiplication circuits of the computing device to include delivery of a first kernel slice of the one or more two-dimensional reduced kernel slices to a first set of multiplication circuits greater in number than a number of multiplication circuits assignable to a non-reduced kernel slice and the one or more input parameters to affect an increase in concurrent multiplication operations across the plurality of multiplication circuits; and initiate processing, at least in part via the plurality of multiplication circuits, the one or more two-dimensional reduced kernel slices and the one or more input parameters at least in part in accordance with the mapping to generate a set of output parameters for the neural network.

35. The article of claim 34, wherein the non-transitory computer-readable medium to have stored thereon further instructions executable by the computing device to:
determine the reduced set of parameters at least in part via execution of a device driver; and/or
map the one or more two-dimensional reduced kernel slices to the plurality of multiplication circuits at least in part via execution of the device driver.

36. The article of claim 35, wherein the non-transitory computer-readable medium to have stored thereon further instructions executable by the computing device to store, via execution of the device driver, an improved-efficiency neural network, to include the one or more two-dimensional reduced kernel slices, in the memory of the computing device.

37. The article of claim 35, wherein the non-transitory computer-readable medium to have stored thereon further instructions executable by the computing device to store, via execution of the device driver, parameters representative of efficiency improvements to include specified hardware configurations and/or the one or more two-dimensional reduced kernel slices in the memory of the computing device.

38. The article of claim 35, wherein the set of parameters representative of the neural network to comprise the one or more input parameters, wherein the one or more parameters are representative of image content.

39. The article of claim 35, wherein the set of parameters representative of the neural network to comprise a set of trained weight parameters representative of the neural network.

40. The article of claim 39, wherein the one or more two-dimensional reduced kernel slices to comprise trained weight parameters to have non-zero values.

41. The article of claim 40, wherein the one or more two-dimensional reduced kernel slices to comprise one or more slices of one or more three-dimensional kernels.

42. The article of claim 40, wherein the one or more two-dimensional reduced kernel slices further to comprise one or more additional weight parameters to have non-zero values, wherein the one or more input parameters to comprise an input feature map, and wherein the non-transitory computer-readable medium to have stored thereon further instructions executable by the computing device to map the input feature map and the one or more two-dimensional reduced kernel slices to the plurality of multiplication circuits at least in part by mapping the one or more two-dimensional reduced kernel slices and the one or more additional weight parameters to the plurality of multiplication circuits.

43. The article of claim 41, wherein the non-transitory computer-readable medium to have stored thereon further instructions executable by the computing device to initiate processing the one or more two-dimensional reduced kernel slices and the one or more input parameters at least in part by storing the one or more two-dimensional reduced kernel slices and the one or more input parameters in a storage buffer at least in part in accordance with the map of the one or more two-dimensional reduced kernel slices to the plurality of multiplication circuits.

44. The article of claim 43, wherein the non-transitory computer-readable medium to have stored thereon further instructions executable by the computing device to map the one or more input parameters and the one or more two-dimensional reduced kernel slices to the plurality of multiplication circuits at least in part by assigning, at least in part via the device driver, particular combinations of the one or more two-dimensional reduced kernel slices and the one or more input parameters to particular multiplication units of the plurality of multiplication circuits.

45. The article of claim 44, wherein the non-transitory computer-readable medium to have stored thereon further instructions executable by the computing device to assign the particular combinations of the one or more two-dimensional reduced kernel slices and the one or more input parameters to the plurality of multiplication circuits at least in part by determining an increased-efficiency mapping at least in part via the device driver analyzing the one or more two-dimensional reduced kernel slices, the one or more input parameters, and the plurality of multiplication circuits.

46. The article of claim 45, wherein the non-transitory computer-readable medium to have stored thereon further instructions executable by the computing device to analyze the one or more two-dimensional reduced kernel slices, the one or more input parameters, and the plurality of multiplication circuits at least in part by determining a number of available multiplication circuits and determining a count of the one or more two-dimensional reduced kernel slices assignable to the available multiplication circuits for concurrent processing.

47. The article of claim 46, wherein the non-transitory computer-readable medium to have stored thereon further instructions executable by the computing device to configure, at least in part via execution of the device driver, the plurality of multiplication circuits based at least in part on the mapping to enable processing of the one or more two-dimensional reduced kernel slices and the one or more input parameters to generate the set of output parameters for the neural network.

48. The article of claim 47, wherein the one or more input parameters to comprise parameters indicative of image content or audio content or a combination thereof, and wherein the processing the one or more two-dimensional reduced kernel slices and the one or more input parameters to generate the set of output parameters for the neural network to comprise generating a set of output parameters indicative of an output feature map.

49. The article of claim 48, wherein the neural network is directed to one or more computer vision applications.

* * * * *